(12) United States Patent
Kang et al.

(10) Patent No.: US 11,911,909 B2
(45) Date of Patent: Feb. 27, 2024

(54) COLLISION-FREE PATH GENERATING METHOD IN OFF-SITE ROBOTIC PREFABRICATION AND COMPUTER-IMPLEMENTED SYSTEM FOR PERFORMING THE SAME

(71) Applicant: SMART BUILDING TECH CO., LTD., New Taipei (TW)

(72) Inventors: Shih-Chung Kang, New Taipei (TW); Liang-Ting Tsai, New Taipei (TW); Cheng-Hsuan Yang, New Taipei (TW)

(73) Assignee: SMART BUILDING TECH CO., LTD., New Taipei (TW)

( * ) Notice: Subject to any disclaimer, the term of this patent is extended or adjusted under 35 U.S.C. 154(b) by 295 days.

(21) Appl. No.: 17/404,059

(22) Filed: Aug. 17, 2021

(65) Prior Publication Data

US 2022/0055213 A1   Feb. 24, 2022

Related U.S. Application Data

(60) Provisional application No. 63/068,055, filed on Aug. 20, 2020.

(51) Int. Cl.
*B25J 9/16* (2006.01)
*G05B 17/02* (2006.01)

(52) U.S. Cl.
CPC ........... *B25J 9/1666* (2013.01); *B25J 9/1671* (2013.01); *G05B 17/02* (2013.01)

(58) Field of Classification Search
CPC ....... B25J 9/1666; B25J 9/1671; G05B 17/02; G05B 2219/40317; G05B 2219/40429; G05B 2219/40448; G05B 2219/40515
See application file for complete search history.

(56) References Cited

PUBLICATIONS

Eric Lloyd Reyson Robles, "Virtual Simulation of Robotic Operations Using Gaming Software", pp. 1-38, May 2020, Texas A&M University) (Year: 2020).*

(Continued)

*Primary Examiner* — Adam R Mott
*Assistant Examiner* — Alyzia N Dilworth
(74) *Attorney, Agent, or Firm* — Jackson IPG PLLC; Demian K. Jackson

(57) ABSTRACT

The present invention relates to a collision-free path generating method for a robot and an end effector quipped thereon to move. The method includes steps of configuring a virtual working environment, containing a plurality of virtual objects at least including the robot, the end effector and a target object consisting of a plurality of basic members and mapped from a working environment in a reality, in a robot simulator; selecting a level of detail and a pre-determined shape for a collider covering the plurality of virtual objects to determine boundaries for the plurality of objects; randomly sampling a combination of robot configurations; and based on the determine boundaries and the randomly sampled combination of robot configurations, performing a heuristic based pathfinding algorithm to compute a collision-free path for the robot and the end effector quipped thereon to move to the target object accordingly.

10 Claims, 13 Drawing Sheets

(56) References Cited

PUBLICATIONS

Mohammed Sadiq Altaf, "Integrated production planning and control system for a panelized home prefabrication facility using simulation and RFID", pp. 1-15, Nov. 2017, University of Alberta, Canada) (Year: 2017).*

Strumm, "Towards Cloud Informed Robotics", pp. 59-64, 2017 Proceedings of the 34rd ISARC, Taipei, Taiwan, hereinafter "Stumm") (Year: 2017).*

"Unity, Colliders—Unity Official Tutorial, Apr. 8, 2013, https://www.youtube.com/watch?v=bh9ArKrPY8w" (Year: 2013).*

* cited by examiner

△ discrete nodes on the original PTP path
○ randomly generated configurations
for each node, where $d_{(\theta_1,\theta_2)} \leq r/R_{(x,y)} \cdot D_{(\theta_1,\theta_2)}$

COLLISION-FREE PATH GENERATING METHOD IN OFF-SITE ROBOTIC PREFABRICATION AND COMPUTER-IMPLEMENTED SYSTEM FOR PERFORMING THE SAME

CROSS-REFERENCE TO RELATED APPLICATION

This application is based upon and claims the benefit of priority to U.S. Provisional Application Number U.S. 63/068,055, filed on Aug. 20, 2020, the entire disclosure of which is incorporated herein by reference.

Cross-references are also made to applicant/assignee's previous U.S. Invention patent application Ser. No. 17/218,685, filed on Mar. 31, 2021, and U.S. Invention patent application Ser. No. 17/218,653, filed on Mar. 31, 2021, now pending, which the both applications are incorporated herein by reference.

COPYRIGHT NOTICE

A portion of the disclosure including at least descriptions, embodiments, claims, and drawings of this patent document contains materials that are subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD

The present invention relates to a collision-free path generating method in off-site robotic prefabrication for a robot and an end effector quipped thereon to move to a target object accordingly and computer-implemented system for performing the same.

BACKGROUND

Robotic automation process in building construction is an emerging technology and involves the use of one or more robotic devices that are applied to construct the building or essential components composing the building, such as a floor panel, a wall panel, a door panel, a window panel, or any other components, in a fully automatic or semi-automatic way.

The robotic devices are usually equipped with end effector to mount and connect tools, such as a gripper or a drill, that is used during the constructing process. The robotic devices are pre-programmed with sequences of specific motion commands and commands for other operations in order to cause the robotic devices to complete the constructing process.

The high degree-of-freedom (DOF) manipulators also allow the industrial robot arm to conduct various of tasks for different building designs. With advanced controls and mechanical systems, the industrial robot arms are excellent in performing repetitive and precise motion tasks, such as component assembly, without human worker intervention.

Therefore, the robotic automation construction is particularly suitable for constructing unique and special structures with features of high complexity, high-mix, and low-volume, and is proved with high degrees of versatility, diversity and flexibility to perform construction works. Through the decades of development, currently there are two major robotic automation construction methods available, the on-site robotic construction scheme and the off-site robotic construction scheme.

The off-site robotic construction scheme highly relies upon the robot motion simulators to plan the trajectories and paths for the robotic devices in advance, since the preparation of numerous parameters, actions, motions and paths of the robotic devices to carry out the constructing process is highly complicated and sophisticated, required to be scheduled, planned, validated, and rehearsed repetitively for many times, prior to the commencement of the constructing process, and impossible to be done by using actual robotic devices.

However, in regard to utilizing the industrial robot arm in the off-site robotic construction process, finding one or more collision-free paths for assembling building components is one of the most critical challenges. Unlike conventional manufacturing processes, such as, car manufacturing, the off-site robotic construction process usually contains thousands of different components for each building. Therefore, the path-finding method must find one or more collision-free paths for numerous different building components.

In addition, the prefabrication process may still require that workers are involved in tasks like material preparation, mechanical, electrical, and plumbing (MEP) installations, or quality inspections. Thus, the path-finding method needs to visualize both the planning process and the generated paths so that the engineer is able to actually apply the method for human-robot interaction planning.

Hence, there is a need to solve the above deficiencies/issues.

SUMMARY

In view of the state of the art, the present invention provides a collision-free path-finding method for the prefabrication in the off-site robotic construction. Although many path-finding methods have been developed over the past decades, they are insufficient for the application of the off-site robotic prefabrication process. When utilizing the industrial robot arm in the prefabrication process, the path planning method needs to consider the specifications of the building component, e.g., size and shape, and the large amounts of different components. Thus, the present invention proposes a robotic path-finding method using game engine technology and a sampling-based algorithm that ensures the robot arm can navigate collision-free paths and visualize the robot path in a virtual environment for further applications.

The present invention focuses on developing a collision avoidance method for an industrial robot arm used in the off-site robotic prefabrication process. When employing the industrial robot arm in the off-site robotic prefabrication process, finding collision-free paths is the most critical issue. However, no existing robot path planning method can consider the particular specifications of the prefabrication approach and generate appropriate paths for such applications. Therefore, the present invention provides a planning method for off-site robotic prefabrication.

The presently invented method achieves multiple effects as follows: (1) The path-finding method should accommodate industrial robot arms made by the most well-known manufacturers with at least 6-DOFs for the application of modular home prefabrication; (2) The path-finding method should take the building components, e.g., wood studs, into consideration and adapt to different sizes of components; and (3) The path-finding method should visualize both the collision-free path and the path-finding processes for the engineer to plan the further human-robot interactions.

Accordingly, the present invention provides a collision-free path generating method, for a robot and an end effector quipped thereon to move. The method includes steps of: configuring a virtual working environment, containing a plurality of virtual objects at least including the robot, the end effector and a target object consisting of a plurality of basic members and mapped from a working environment in a reality, in a robot simulator; selecting a level of detail and a pre-determined shape for a collider covering the plurality of virtual objects to determine boundaries for the plurality of objects; randomly sampling a combination of robot configurations; and based on the determine boundaries and the randomly sampled combination of robot configurations, performing a heuristic based pathfinding algorithm to compute a collision-free path for the robot and the end effector quipped thereon to move to the target object accordingly.

The present invention further provides a computer-implemented system. The system includes: a user equipment installed with a web browser to enable web browsing to access an internet for a user to operate; and a cloud computing server system available on the internet providing for the user to operate via the web browser on the user equipment and configured to: configure a virtual working environment, containing a plurality of virtual objects at least including the robot, the end effector and a target object consisting of a plurality of basic members and mapped from a working environment in a reality, in a robot simulator; select a level of detail and a pre-determined shape for a collider covering the plurality of virtual objects to determine boundaries for the plurality of objects; randomly sample a combination of robot configurations; and based on the determine boundaries and the randomly sampled combination of robot configurations, perform a heuristic based pathfinding algorithm to compute a collision-free path for the robot and the end effector quipped thereon to move to the target object accordingly.

The above contents described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

Figure 1:
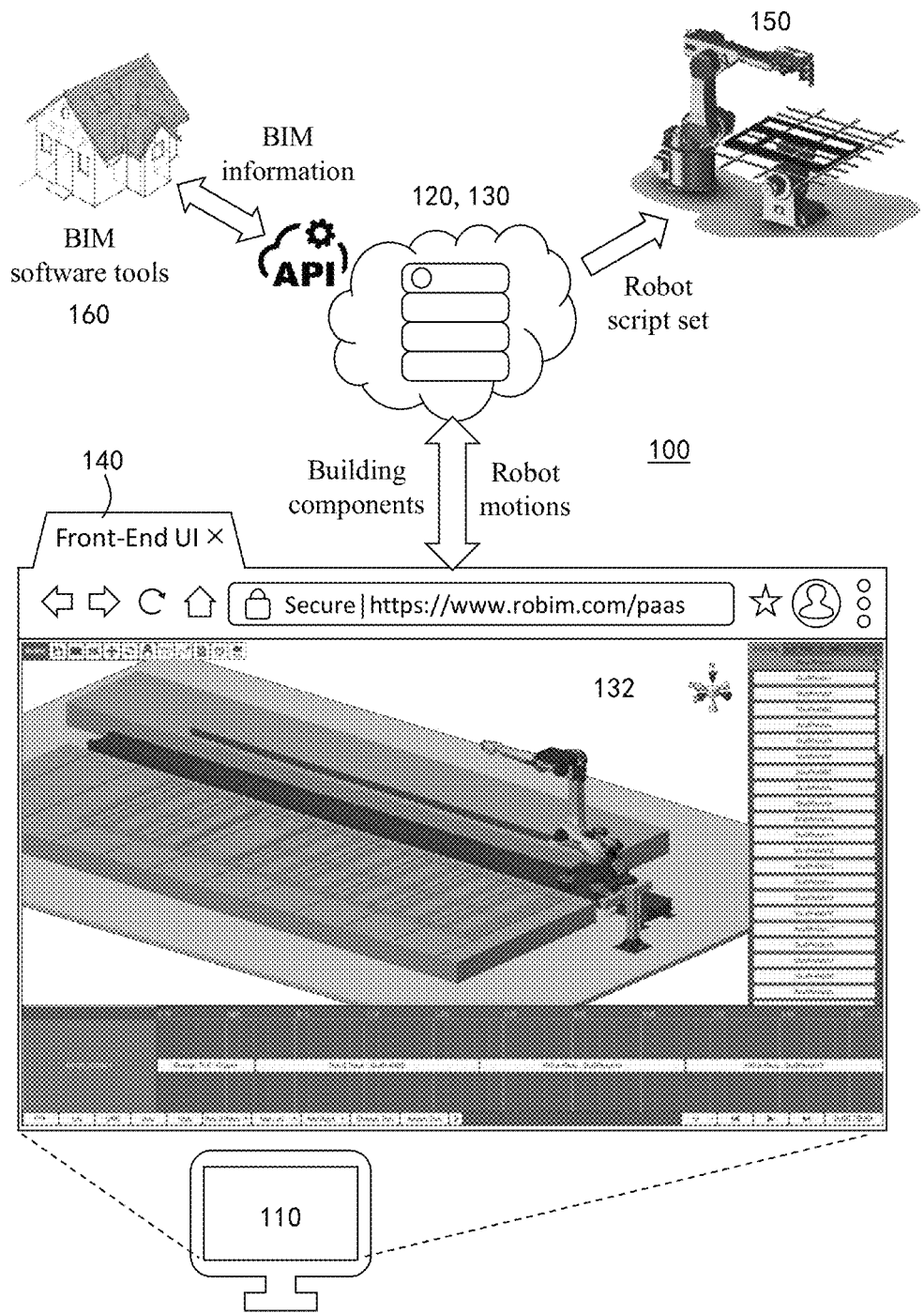
FIG. 1 is a schematic diagram illustrating a system view for a cloud based computer-implemented system according to a first exemplified embodiment of the present invention.

The present disclosure will be described with respect to particular embodiments and with reference to certain drawings, but the disclosure is not limited thereto but is only limited by the claims. It is clear that other embodiments can be configured according to the knowledge of persons skilled in the art without departing from the true technical teaching of the present disclosure, the claimed disclosure being limited only by the terms of the appended claims.

The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

In this disclosure, the terms "robot", "robots", "robotic device", "robotic devices" and the like refer to any automatically operated mechanical machine which is programmed to perform a wide variety of functions, operations, duties or tasks automatically, may not resemble human beings in appearance or perform in a humanlike manner, and have different scalable formation varied from a lightweight manufacturing robots to a heavy-load or heavy-duty assembly robots. In certain embodiments of the disclosure, the robot is preferably an industrial robot or a multi-axis robot arm, and may be regarded as a robot builder.

The term "building" means any form of building, such as a house, a wooden house, a reinforced concrete building, a steel building, a steel-reinforced concrete building, a residential complex, an apartment complex, a condominium, a dwelling unit, or a skyscraper, which is built by implementing civil engineering means or civil engineering based construction works.

The term "construction base" and "building foundation" refers to a site, a place, an area, a location, a spot, a position, a base or a venue on which a building is under construction. The term "construction site" refers to a site, a place, an area, a location, a spot, a position, a base or a venue where construction works are carried out.

The terms "near-site position", "near site" and the like mean a site, a place, an area, a location, a spot, a position, a base or a venue situated near, in a close proximity to, close to, or next to the construction site, the construction base, or the building foundation preferably less than 50 meters, 100 meters, 150 meters, 30 meters or 500 meters, as well as the terms "near-site position", "near site" and the like mean a site, a place, an area, a location, a spot, a position, a base or a venue situated within a periphery or a periphery area around the construction site and has a diameter preferably less than 50 meters, 100 meters, 150 meters, 30 meters or 500 meters.

The terms "work cell" and "scene" refer to a cluster of robotic devices, equipment, and materials that are required for the robotic device to carry out the fabrication task, in particular a construction component prefabrication task. The configuration of the work cell is highly in association with the productivity and costs. The user is able to try different combinations of work parameters, and change different robotic device to test and find out and a better configuration. In this disclosure, the work cell is equivalent to and also known as the scene.

It has become an emerging trend to use the industrial robot arm in the off-site robotic construction process, for example, the modular home prefabrication process. While using the robot arm in the prefabrication process, finding out collision-free paths for the robot arm when assembling several hundreds of thousands of building components is one of the most critical challenging issues. Although the path-finding for the robot arm has been developed in computer science and mechanical engineering for decades, no collision-free path-finding methods for robotic modular home prefabrication have yet been developed.

In the manufacturing industry, the pre-planned assembly process can be utilized repeatedly due to the mass production of a single product. However, the product's design, such as size and shape, changes constantly in the field of modular construction. Therefore, when planning the robot motions for modular home prefabrication, both the specifications of the modular construction approach and the industrial robot arm's capacity need to be considered. The following three sections will review the literature in the context of the specifications of the modular construction approach, the applications of robotics in modular construction, and robotic path planning methods.

FIG. 1 is a schematic diagram illustrating a system view for a cloud based computer-implemented system according to a first exemplified embodiment of the present invention. FIG. 1 demonstrates an exemplified computer-implemented system 100 that preferably includes at least one user equipment 110 and a cloud computing server system 120. The cloud computing server system 120 may be a cluster of cloud-based computing servers and provides cloud-based centralized computing power, in contrast to the edge or distributed computing power executed on the separated individual nodes, such as the user equipment 110.

The user equipment 110 has the internet capability, is preferably a web-enabled user equipment or an internet capable device that is equipped with appropriate internet connectivity, such as Wi-Fi, Bluetooth, 4G, 5G, 6G, or Sub-1G, and installed with a web browser 140 to enable web browsing to access internet. The exemplified user equipment 110 preferably is, such as mobile internet device (MID), portable internet device, desktop computer, notebook computer, tablet device, game console, smart glass, or mobile phone device.

A computer-assisted cloud based robotic construction software platform 130 (hereinafter referred to as the platform for short), also known as a robot simulator, is established based on the software as a service (SAAS) technology and the platform as a service (PAAS) technology and a backend cross-platform software. The platform 130 is originally installed and functions on the cloud computing server system 120, addressed on the internet by specifying a uniform resource locator (URL), and thus available to users or subscribers over the internet. Any user is able to access, use, and operate the platform 130 easily by connecting to the internet by one's own user equipment 110, opening the web browser 140 on the user equipment 110 and entering the URL directing into the web browser 140.

The platform 130 is configured to generate various visualization interfaces 132 acting as frontend user interfaces in the web browser 140 running on the user equipment 110. The platform 130 is configured to receive user operations corresponding to interactions with visualization interfaces 132 shown in the web browser 140 from one's own user equipment 110 as instructions to execute correspondingly and accordingly.

In response to the received user operations, the platform 130 is capable of executing a variety of built-in modules that enable various assistances in all aspects of coordinating, sequencing, scheduling, planning, and simulating robotic motions or paths of one or more robots, for any users to coordinate, sequence, schedule, plan, design, simulate, re-sequence, re-schedule, re-plan, re-design robotic motions or paths for one robot or among more robots. The platform 130 is configured to conclude the determined robotic motions as a predetermined motion command set or a robot script set and output and transmit the set to the respective controllers of the corresponding actual robots 150. The platform 130 further includes a couple of externally-operated modules in a form of add-ins module cooperated with and functions within the building information modelling (BIM) software tools 160, such as AUTODESK REVIT, SketchUp, GRAPHISOFT ARCHICAD, etc., for any users to operate.

Preferably, the robot or robots are industrial-use multi-axis robots and used in construction process, such as semi-automated construction, automated construction, or near-site construction, to perform a physical fabrication task, in particular, a construction component prefabrication task. The construction process may involve the use of one or more robots that may be used to construct a variety of components of a building. The robots may be equipped with end-effector-mounted tools, such as a gripper or a drill, that may be used during construction process. The actual robots are configured and controlled to act according to the predetermined motion command set including sequences or paths of specific motions sent from the respective controllers to complete the specified task.

The platform 130 is preferably a no-code robotic motion simulation software, and the generated visualization interfaces 132 in the web browser 140 may provide multiple visualization-based functions and various easy-to-use robotic programming tools. The platform 130 is configured to provide a simulation to real (sim-to-real) virtual physical environment with built-in physics engine that enables virtual robot objects to simulate or approximate universal forces existing in the real world, such as gravity, velocity, acceleration, friction, etc., for any users with different level of computer skills distributed from ordinary people, such as subscribers or contractors, to professionals, such as programmers, designers or engineers, to simulate robotic motions or paths without writing or typing a single line of code.

In some embodiments, visualization interfaces 132 are embedded with a variety of quick menus, dropdown menus, buttons and toggles with highly customizable configurations for the specific purpose of easy-to-use. Any user from ordinary people, such as subscribers or contractors, to professionals, can perform the planning and simulations for robotic construction process without typing a single line of code and actually actuating the robots. In particular, the visualization interfaces 132 are especially enhanced and improved in the aspect of visualizing the timeline-related arrangement and scheduling processes for robotic motions of a single robot, or among multiple robots.

Figure 2:
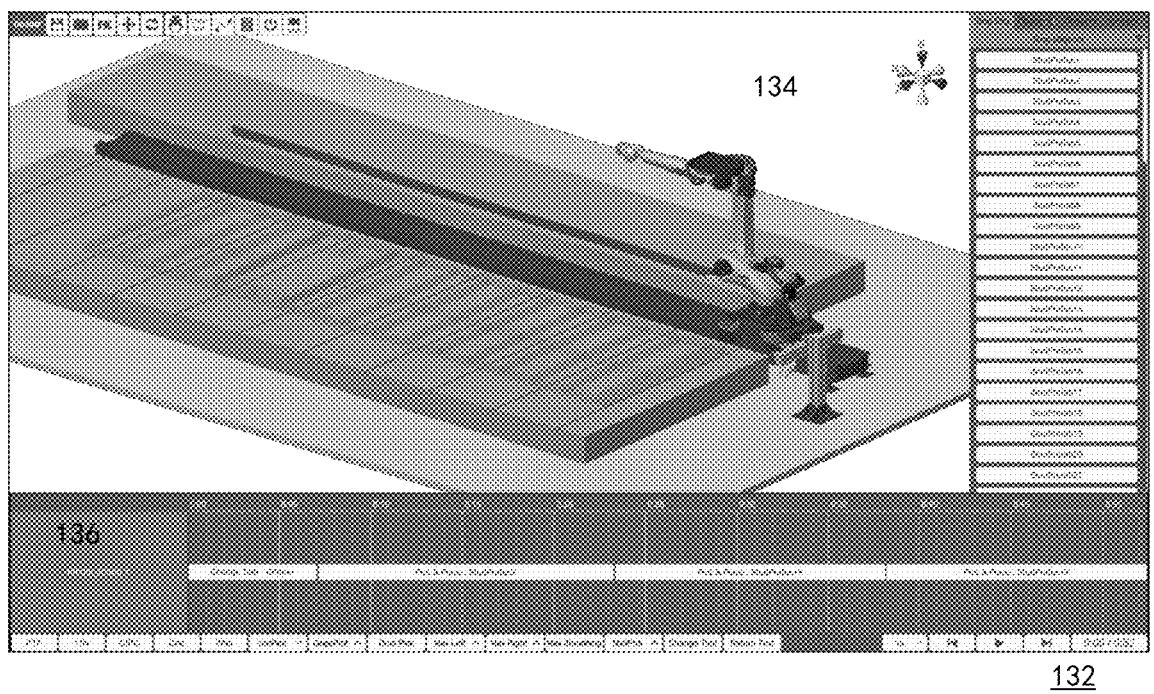
FIG. 2 is a schematic diagram illustrating a standard layout of the visualization interface generated by the platform in accordance with the present invention.

FIG. 2 is a schematic diagram illustrating a standard layout of the visualization interface generated by the platform in accordance with the present invention. The platform 130 is configured to generate a series of visualization interfaces 132 to be provided through the web browser 140 for any user to access and operate the platform 130. Four edges, including the left-hand and right-hand sides and the upper and lower parts, of the respective visualization interfaces 132 are preferably arranged and configured to embed with a variety of functional sidebars, toolbars, operating panels, or functional panels. The most and central part within the respective visualization interfaces 132 is configured to provide a main display window 134 virtually showing an animated simulation for the robots and the work cell. In some embodiments, the visual programming panel 136 is preferably a horizontal toolbar and to be positioned, for example, at the lower part of visualization interface 132.

Figure 3:
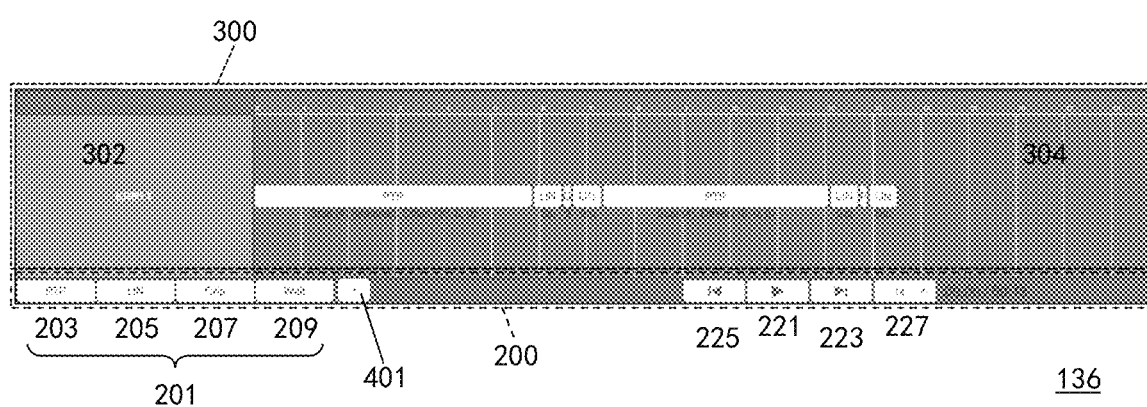
FIG. 3 is a schematic diagram illustrating an exemplified visual programming panel embedded in the visualization interface according to the present invention.

FIG. 3 is a schematic diagram illustrating an exemplified visual programming panel embedded in the visualization interface according to the present invention. The visual programming panel 136 preferably includes at least one timeline editor 300 and a bottom bar 200. The at least one timeline editor 300 is identified by a robot ID filled and designated in the robot ID field 302, which is opened for a user to input, and is assigned to program and configure motions for a target robot corresponding to robot ID.

The timeline editor 300 provides a timeline workspace 304 over a horizontal timeline view in the background. The timeline view may contain multiple timescales that are spaced with each other in an equal or variable distance used to indicate a defaulted time interval, for example, 1 second, in this embodiment. The bottom bar 200 includes a plurality of various basic action blocks 201, and a plurality of control buttons including a play button 221, a forward button 223, a backward button 225, and a play speed button 227, for any users to use.

Each of basic action blocks 201 are labeled with an action name consisting of, such as, a capitalized acronym or one or more words, represent for a specific robotic action, and refer to an action instruction set that consists of a series of, such as, parameters, declarations, statements, and codes that are defaulted by a user to enable the end effector or the robot to complete a specific action consisting of multiple basic actions subject to the given conditions. The action block is referred to as an action unit, an action box, an action element, an action item, or an action component as well. In some embodiments, one or more basic action blocks 201 can be nested within one basic action block 201. Several exemplified basic action blocks 201 are provided in this disclosure.

For instance, the PTP action block 203 is the basic action block 201 labeled with the acronym of PTP and consists of an action instruction set that is generated and defaulted by a user to enable a series of basic actions to achieve a point-to-point (PTP) action to cause the end effector of the robot to complete a movement to move from one point to another point subject to all the given conditions. The Grip action block 207 is one of the basic action blocks 201 labeled with the word of Grip and consists of an action instruction set that enables the end effector to complete a grip action to grip a selected member/object with an adequate pressure subject to the given conditions.

The LIN action block 205 is the basic action block 201 labeled with the acronym of LIN and consists of an action instruction set that enables the end effector to complete a linear movement from one point to another point in a linear trajectory subject to the given conditions. The Wait action block 209 is the basic action block 201 labeled with the word of Wait and consists of an action instruction set that enables the end effector to suspend or stay still in the current position. A Nail action block is the basic action block 201 labeled with the word of Nail and consists of an action instruction set that enables the end effector to perform a nailing action.

The specific basic action which one of the basic action blocks 201 represents for is user-definable, customizable and expandable. The present system 120 allows a user to define and configure a new basic block represents for a new specific basic action by programming a corresponding API. A user may create a new basic block to complete a specific action on one's own interest. The length of each of the blocks 201 represents for the runtime of the specific action, and is adjustable.

The visual programming panel 136 allows a user to code programs and set up configurations required to drive the end effector or the robot in the robot simulator by simply dragging and dropping multiple basic action blocks 201 into the timeline editor 300, in a fun fashion like the building of a puzzle, instead of writing complex computer codes. The spatial arrangement and sequence of the multiple basic action blocks 201 on the timeline workspace 304 in the timeline editor 300 is the sequence of specific actions performed in the robot simulator.

In some embodiments, while the scene, and the conditions and parameters are given and set up, and the target robot is designated in the robot ID field 302, a particular basic action block 201 representing for a specific action, for example, a PTP action block 203 representing a point-to-point action, is selected and dragged into the timeline editor 300. The length of the PTP action block 203 is duly adjusted and represents for the runtime. The fixed-interval timescales distributed over the timeline view is capable of assisting in the estimation of the runtime for completing the point-to-point action.

More basic action blocks 201 are allowed to be added into the timeline workspace 304 in the timeline editor 300 with a particular sequence to form a chain of actions for the target robot to perform in the robot simulator. In some embodiments, multiple block including the LIN action block 205, the Grip action block 207, the LIN action block 205, the PTP action block 203, the LIN action block 205, the Grip action block 207, and the LIN action block 205, are sequentially added into the timeline workspace 304, as shown in FIG. 3. In FIG. 3, the horizontal spatial arrangement of the above all action blocks in the timeline editor 300 refers to a chain of actions to be performed by the target robot in the robot simulator. The timeline editor 300 demonstrates how a set of robotic actions is sequenced and scheduled overtime as well.

Whenever a user feels the arrangements of the action blocks are completed anytime, the play button 221 is able to be clicked to commence the animated simulation of the scheduled and programmed chain of actions in the main display window 134. The present visual programming panel 136 is helpful to reduce the barrier of entry to use the platform 130 for any naive player or user who even does not know how to write or type a single line of code to simulate the robotic construction.

When the animated simulation shows an acceptable result for the robotic actions, the robot simulator concludes the corresponding configurations and simulation results by transforming the programmed robotic actions configured on the visual programming panel into an action command set including the corresponding required coding, and streams out the action command set to the designated actual robot to move accordingly, so as to perform tasks in, for example, an off-site robotic construction.

In this embodiment, a collision avoidance method for robotic modular home prefabrication is developed to try to search out a collision-free path for a robot and an end effector equipped thereon to move. The method aims to find out collision-free paths for an industrial robot arm employed in the prefabrication process and was designed according to the particular specifications of the modular home prefabrication process.

Three major phases are involved in the presently invented method. First, a virtual working environment configured in a game engine is utilized to allow the industrial robot arm to navigate in the Cartesian coordinate system of the working environment. Therefore, the first phase of the method is to construct a three-dimensional digital virtual model for the robot arm, the factory working environment, and the materials in the reality world. The present invention further proposes a multiple level of detail collider setting method for increasing the collision-check process. Then, a series of robot configurations are randomly sampled in the second phase in consideration with the size of the picking component, the distance between the initial position and the target position, and the capacity of the robot arm.

The terms of the robot configuration, the randomly generated configuration, the randomly sampled configuration in this disclosure are preferably referred to as a series of randomly sampled coordinates representing multiple specific spatial positions spreading in a three-dimensional space that are sourced from either being randomly sampled from or derived from, and distributed close to a basic robot trajectory that is automatically generated by, such as, the PTP (the point to point movement) basic action or the LIN (the linear movement) basic action, provided by the platform 130 and acts as a seed, matrix, reference or base trajectory through the sampling process so as to randomly sample out the series of coordinates.

Finally, in the third phase, a heuristic based pathfinding algorithm is applied for searching out a collision-free path based on the randomly generated configurations. The heuristic based pathfinding algorithm is preferably selected from one of, for example, an improved A star (A*) search algorithm, an A star search algorithm, a metaheuristic search algorithm, an inference engine algorithm, a binary search algorithm, a hill climbing algorithm, a simulated annealing algorithm, a genetic algorithm, a tabu search algorithm, a heuristic based shortest path faster algorithm, and a combination thereof.

The first phase is to set up a corresponding digital virtual model in the virtual working environment for the complete robotic production line in the reality working environment. In this embodiment, the presently invented method uses the virtual robot arm to navigate in a simulated environment and find out collision-free paths. Therefore, when building the digital virtual model, all objects in the production line, such as, a material cutting machine, e.g., a CNC machine, a material transportation machine, e.g., a conveyor, a robot workstation, and even the ground surface of the plant in the reality working environment are correspondingly mapped and modelled in the format of 3D models to build the virtual working environment.

Figure 4:
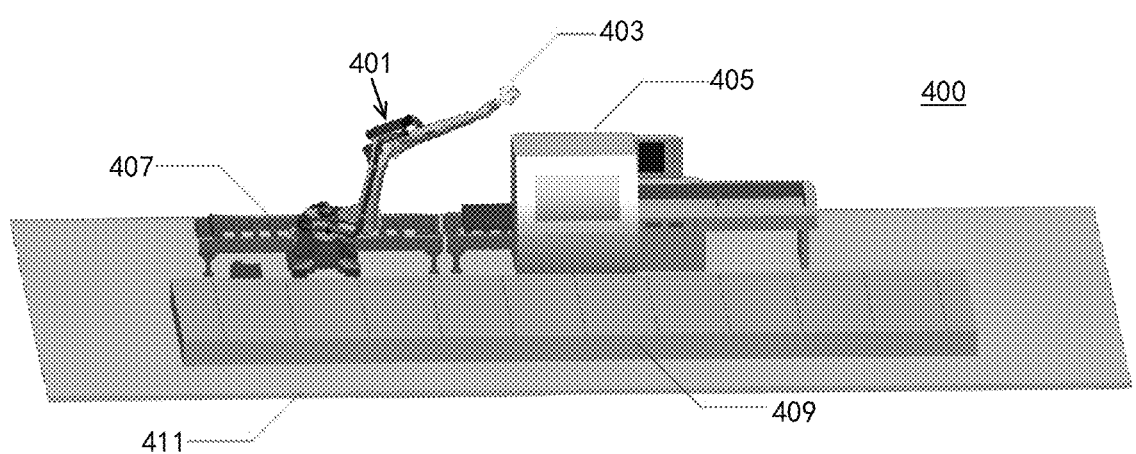
FIG. 4 is a schematic diagram illustrating an example of a robotic production line built in the virtual working environment in accordance with the present invention.

FIG. 4 is a schematic diagram illustrating an example of a robotic production line built in the virtual working environment in accordance with the present invention. The virtual production line 400 includes multiple 3D models, such as, an industrial robot arm 401 equipped with a gripper 403, a CNC machine 405 for material cutting, a conveyor 407 for transporting the cut material, a workstation 409 for panel assembly tasks, and the ground surface 411 of the plant. A forward kinematics (FK) solvers of the robot arm are built in the virtual working environment for generating the robotic trajectories.

After the digital virtual model is set up, all the 3D models in the virtual working environment are covered by and contained in at least one collider. Each collider preferably has a pre-determined shape selected from a rectangular shape, a box shape, a round shape, a triangular shape, or a cone shape. In the virtual working environment, in some embodiments, a mesh formed by multiple colliders having the same or different shapes are applied to fit each 3D models, so as to determine the boundaries of each 3D models. If two objects' colliders have intersections, then the platform 130 determines that a collision happens between the two objects. When conducting the collision check, the platform 130 checks out whether there is an intersection occurring between each colliders frame by frame. Therefore, if there is none of box-shaped geometric objects, e.g., cone-shaped objects, which may contain many colliders, in the virtual working environment, the system needs to check out all the colliders in every frame.

In this embodiment, a three-level-of-detail (3-LOD) collider setting method for reducing the computational cost of the collision check in the virtual working environment is provided. TABLE 1 lists the descriptions and examples for each level of the presently invented method. For each object in the environment, a single box-shaped collider would be used to cover the entire object, e.g., cantilever rack, without considering its shape in the low LOD setting. In the medium LOD setting, box-shaped colliders are used to cover each component, e.g., wheels of the cantilever rack, in a single object without considering its shape. In the high LOD setting, if there are any non-box-shaped components in a single object, then meshed colliders would be used to cover it.

TABLE 1

| LOD | Description | Example |
| --- | --- | --- |
| Low | Use a single box-shaped collider to cover the entire object without considering the shape of it. | Box-shaped colliders for conveyor, workstation, CNC machine, cantilever rack. |
| Medium | Use box-shaped colliders to cover each component in a single object without considering the shape of it. | Box-shaped colliders for rollers of a conveyor, feet of a workstation table, material feeding plate of a CNC machine, wheels of a cantilever rack. |
| High | Use mesh colliders for each component in a single object in consideration of the shape of each. | Mesh colliders for rollers of a conveyor, control boxes of a CNC machine, wheels of a cantilever rack. |

Figure 5A:
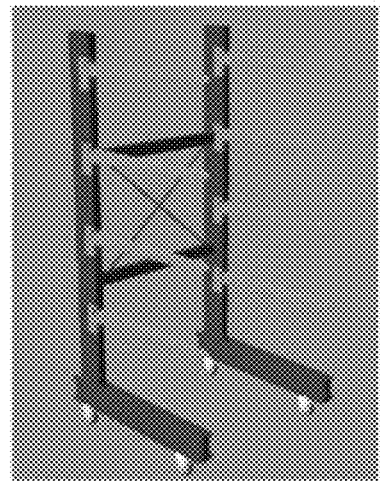
FIG. 5(a) is schematic diagram illustrating an example of setting colliders for a cantilever rack in accordance with the present invention.
Figures 5B, 5C, 5D:
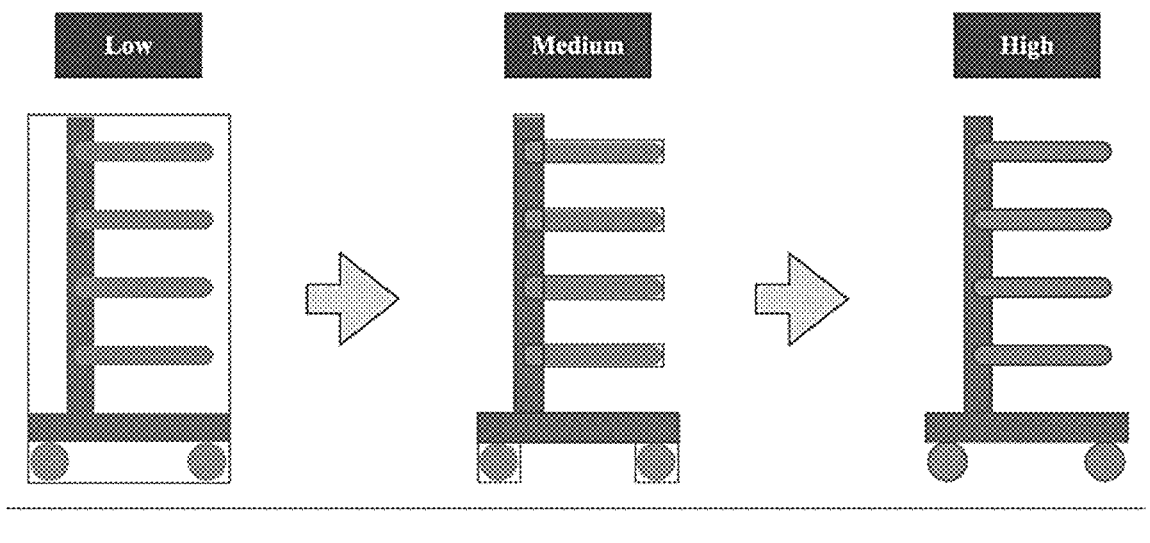
FIG. 5(b) to FIG. 5(d) are schematic diagrams illustrating an example of setting colliders for a cantilever rack in accordance with the present invention.

FIG. 5(a) is schematic diagram illustrating an example of setting colliders for a cantilever rack in accordance with the present invention. FIG. 5(b) to FIG. 5(d) are schematic diagrams illustrating an example of setting colliders for a cantilever rack in accordance with the present invention. In this embodiment, the cantilever rack as shown in FIG. 5(a) is commonly used in a modular home factory for material piling. In the low LOD setting as shown in FIG. 5(b), a single box-shaped collider is used to cover the entire rack. In the medium LOD setting as shown in FIG. 5(c), 20 box-shaped colliders will cover the 20 components in the rack. Finally, in the high LOD setting as shown in FIG. 5(d), mesh colliders will be used for wheels and cantilever beams, which a single box-shaped collider cannot cover. For the convenience of expression, in this embodiment, the term "high level," "medium level," and "low level" will be used to refer to the high level-of-detail (LOD) setting, the medium LOD setting, and the low level LOD setting, respectively.

ALGORITHM 1 illustrates the presently invented method of collision-check function with 3-LOD colliders. In the beginning, all objects in the environment would use low level colliders as their boundary. Then, the collision-check between the gripped object, e.g., studs or sheathings, and every collider in the environment would be conducted frame by frame. If a collision is detected, the collider of the collided object would turn into the medium level. Collision-check would then be conducted again based on the medium LOD colliders of the object. If a collision is still detected, then another collision check would be conducted based on the high LOD collider setting. Results of the function would be Collided, a Boolean variable to show whether the motion results in a collision or not.

ALGORITHM 1
3LOD_COLLISION_CHECK ( )

Input:
Motion: the robot motion for collision check
Output:
Collided: a Boolean variable to show if the motion results in a collision or not
 1:  Collided.init (False)
 2:  foreach object in the environment do
 3:      object.TurnOnLowLODCollider
 4:  end foreach
 5:  foreach frame in Motion do
 6:      foreach collider in the environment do
 7:          Collided ← collision check
 8:          if Collided do
 9:              collider.getColliderObject.TurnOnMediumLODCollider
10:              Collided ← collision check
11:              if Collided do

ALGORITHM 1
3LOD_COLLISION_CHECK ( )

12:              object.TurnOnHighLODCollider
13:              Collided ← collision check
14:              if Collided do
15:                  return Collided
16:                  break
17:              end if
18:          end if
19:      end if
20:      end foreach
21:  end foreach
22:  return Collided The second phase is to generate robot configurations in the virtual working environment randomly. The presently invented method will randomly generate configurations along the path generated by the point-to-point (PTP) planner of the robot arm. The PTP planner can generate the quickest path to an end position. However, the trajectory of the motion generated by PTP may still have collisions since it uses only the angle differences between the start and end position and the joint speeds to generate robotic trajectories without considering the interaction with the environment. Instead of randomly generating configurations in the entire environment, the presently invented method uses a sub-global sampling method in consideration of the length of the target object, the distance between the initial position and the target position of the target object, and the configuration distance between the initial configuration and the target configuration. In the beginning, the original PTP motion would be divided into $N_{dis}$ discrete with the same configuration distance, $$\frac{D^{(n)}}{N_{dis}}.$$

The $D^{(n)}$ is the configuration distance between the initial configuration and the target configuration, which can be calculated by Equation 1.

$$D^{(n)} = \sqrt{(\theta_{init\_1}\theta_{tar\_1})^2 + (\theta_{init\_2} - \theta_{tar\_2})^2 + \ldots + (\theta_{init\_n} - \theta_{tar\_n})^2} \quad \text{[Equation 1]}$$

where n represents the number of DOFs of the robot arm. The initial and target configuration can be calculated by an inverse kinematic (IK) solver. The IK solver, which is usually a built-in function in a commercial robot simulator, can determine the angles of each joint based on the end-effector's position in the Cartesian coordinate. For each node, $N_{node}$ of configurations would then be randomly generated within a configuration distance $d^{(n)}$. Equation 2 illustrates the definition of $d^{(n)}$.

$$d^{(n)} \leq \begin{cases} \frac{r}{R^{(3)}} D^{(n)}, & \text{if } \frac{r}{R^{(3)}} D^{(n)} \leq D^{(n)}_{max} \\ D^{(n)}_{max}, & \text{otherwise} \end{cases} \quad \text{[Equation 2]}$$

where r represents the longest dimension of the gripped object (e.g. length of the stud). In the framing process, the timber materials usually have similar section areas (e.g., two-by-four, two-by-six, etc.) but various in the length dimension. Therefore, the proposed method generates random configurations based on the length of the stud. $R^{(3)}$ represents the distance of the gripped object from the initial position to the target position, which can be calculated using Equation 3. $D_{max}^{(n)}$ is a pre-set boundary for constraining the robot arm's maximum movement, and $$\frac{r}{R^{(3)}}$$

indicates that the distance would be influenced by both the length of the gripped object and distance between the initial position and the target position. A longer object may need larger searching areas for collision-free paths while the shorter distance between the initial position and the target position needs larger searching areas.

$$R^{(3)} = \sqrt{(x_{init} - x_{tar})^2 + (y_{init} - y_{tar})^2 + (z_{init} - z_{tar})^2} \quad \text{[Equation 3]}$$

After randomly generating all the configurations, they are stored as a matrix C, as shown in Equation 4. C would then be sent to the path searching phase for finding the shortest collision-free path based on the sampled configurations.

$$C = \begin{bmatrix} c_{11} & c_{12} & \cdots & c_{1(N_{node}+1)} \\ c_{21} & c_{22} & \cdots & c_{2(N_{node}+1)} \\ \vdots & \vdots & \ddots & \vdots \\ c_{(N_{dis}-1)1} & c_{(N_{dis}-1)2} & \cdots & c_{(N_{dis}-1)(N_{node}+1)} \end{bmatrix} \quad \text{[Equation 4]}$$

Figure 6:
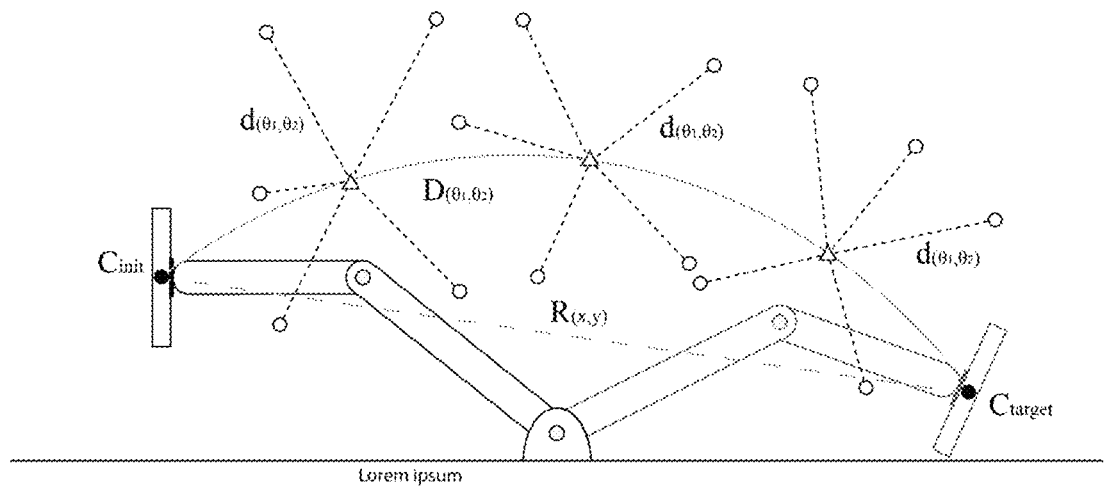
FIG. 6 is a schematic diagram illustrating an example of the sampling method with a 2-DOF robot arm in a 2D space in accordance with the present invention.

FIG. 6 is a schematic diagram illustrating an example of the sampling method with a 2-DOF robot arm in a 2D space in accordance with the present invention. The parameters $C_{init}$ and $C_{target}$ are the initial and target configurations, respectively, of the robot arm. $D_{(\theta_1, \theta_2)}$ is the configuration distance calculated by $\Delta\theta_1$ and $\theta_2$ from the initial configuration to the target configuration. The parameter $R_{(x,y)}$ is the distance between the initial position and the target position in the 2D space. The given parameter $N_{dis}$ is equal to 4, three nodes are generated on the original PTP path. When the parameter $N_{node}$ is assigned with a value of 5, five configurations would then be randomly generated with a distance less than $d_{(\theta_1, \theta_2)}$. Therefore, in this example, 18 configurations would be stored as a matrix and sent to the path searching phase.

ALGORITHM 2 illustrates the function of sampling configurations in the proposed method. The initial configuration ($c_{init}$), the target configuration ($c_{target}$), the longest dimension of the gripped object (r), the maximum configuration distance ($D_{max}^{(n)}$), the number of discrete on the PTP path ($N_{dis}$) and the number of configurations of each discrete ($N_{node}$) are the input parameters of the function. Then, $D^{(n)}$, $d^{(n)}$, and $R^{(3)}$ are calculated using Equations (1), (2), and (3). C is the $(N_{dis}-1) \times (N_{node}+1)$ matrix that is used for storing all the sampled configurations. Each of the discrete nodes on the PTP path are first generated then stored in the first column of C. A configuration of the robot arm, $C_{ran}$, is randomly generated. If the configuration distance between $c_{ran}$ and the nodes on the PTP motion is less than $d^{(n)}$, then $c_{ran}$ would be added to the row of the related nodes. The function would keep generating $C_{ran}$ until each discrete node has $N_{node}$ configurations. After generating all the configurations, the matrix, C, is the output of the function.

In the first column of C, a configuration of the robot arm, $c_{ran}$ is randomly generated. If the configuration distance between $c_{ran}$ and the nodes on the PTP motion is less than $d^{(n)}$, then $c_{ran}$ would be added to the row of the related nodes. The function would keep generating $c_{ran}$ until each discrete node has $N_{node}$ configurations. After generating all the configurations, the matrix, C, is the output of the function.

---

ALGORITHM 2
CONFIGURATION_SAMPLING ( )

---

Input:
 $c_{init}$: the initial configuration
 $c_{target}$: the target configuration
 r : the longest dimension of the gripped object
 $D_{max}^{(n)}$: the configuration distance constraint for sampling
 $N_{dis}$: the number of discrete of the PTP path
 $N_{node}$: the number of each node of discrete on the PTP path
Output:
 C: a matrix with all the generated configurations
 1: $D^{(n)} \leftarrow$ get the configuration distance between $c_{init}$ and $c_{target}$
 2: $R^{(3)} \leftarrow$ get the distance between the initial and target position in 3D space
 3:
$$d^{(n)} \leftarrow \frac{r}{R^{(3)}} D^{(n)}$$
 4: if $d^{(n)} > D_{max}^{(n)}$ do
 5:  $d^{(n)} \leftarrow D_{max}^{(n)}$
 6: end if
 7: for i from 1 to $N_{dis} - 1$ do
 8:
$$C[i][1] \leftarrow c_{init} + \frac{D^{(n)}}{N_{dis}}$$
 9:  while len(C[i]) < $N_{node}$ + 1 do
 10:   $c_{ran} \leftarrow$ randomly generate configuration
 11:   d ← get configuration distance between C[i][1] and $c_{ran}$
 12:   if d < $d^{(n)}$ do
 13:    C[i].add($c_{ran}$)
 14:   end if
 15:  end while
 16: end for
 17: return C

---

For the path search phase, a heuristic based pathfinding algorithm, for example, an improved A star (A*) search algorithm, is used to search for a collision-free path from the sampled configurations. The improved A* search algorithm is a path searching algorithm that uses the heuristic determination method to search a path with the minimum cost from a series of given nodes. The algorithm searches the path from the starting node and extends the path one node at a time until it reaches the target node. It uses a cost function, ƒ(n), to determine which node the path should extend to during the searching process. Equation 5 defines the function ƒ(n).

$$f(n) = g(n) + h(n) \quad \text{[Equation 5]}$$

where n represents the potential node to which the path would extend, g(n) is the travelling cost from the start node to node n, and h(n) is the travelling cost from n node to the target node. By finding the lowest cost from node to node with several iterations, the algorithm can find a path from the start node to the target node with minimum travelling cost, where the cost is the travelling time for the robot arm to move from one position to another.

ALGORITHMS 3 to 6 illustrate the developed path searching method with the improved A* search algorithm. The method contains four main functions: GET_NEIGHBOURS, GET_COST, GET_PATH, and PATH_SEARCHING.

The GET_NEIGHBOURS function is used to find the neighbouring configuration of a specific configuration in the matrix generated in the sampling phase. In the proposed method, all the configurations in the same row of the matrix and configurations one row before and after are considered as neighbours of the given configuration. For instance, the neighbours of $c_{21}$ in the matrix C include $c_{22}$ to $c_{2(N_{node}+1)}$, $c_{11}$ to $c_{1(N_{node}+1)}$, and $c_{31}$ to $C_{3(N_{node}+1)}$. In the GET_NEIGHBOURS function, the matrix generated from the sampling phase, C, the given configuration, X, the initial configuration, $C_{ini}$, and the target configuration, $C_{tar}$, will be the input arguments of the function. A list of neighbours, Neighbours, of the given configuration is the output result. The index of the X in the matrix C is assigned as Index at the beginning of the function. If X is in the first row of C, then all configurations in the first row and the second row and $C_{ini}$ will be added to Neighbours. If X is in the last row of C, then all configurations in the last row and the second last row and $C_{tar}$ will be added to Neighbours. Otherwise, configurations in the same row, one row before, and one row after will be added to Neighbours.

The GET_COST function calculates the travelling cost between two given configurations. The start configuration, $C_{start}$, the end configuration, $C_{end}$, and the penalty for collisions, P, are the input arguments of the function. The cost of the travelling time, $C_{ost}$, is the output result. The travelling time for the robot arm to move from the start configuration to the end configuration using a PTP motion is assigned as $C_{ost}$. If any collisions happen during the movement, then a penalty, P, will be added to $C_{ost}$. Depending on the simulator and the robotic working environment, P should be a variable sufficiently large enough to distinguish whether a PTP has collisions or not.

The GET_PATH function retrieves a new collision-free path from a series of configurations. The last searched configuration, X, and the initial configuration, $C_{ini}$, are the input arguments of the function. A list, Path, which stores the configurations on the path, is the output result. X would first be added to Path at the beginning of the function. Then, the configuration where X comes from will be assigned as a temporary configuration and added to Path. The loop runs until the temporary configuration is the same as $C_{ini}$.

In the PATH_SEARCHING function, $C_{ini}$, $C_{tar}$, and C are the input arguments of the function. The user needs to assign a sufficiently large number as the collision penalty P. The g-cost of $C_{ini}$ is assigned as zero. The h-cost of $C_{ini}$ is calculated by using the GET_COST function with $C_{ini}$ and $C_{tar}$ as the input arguments. The f-cost of $C_{ini}$ is the summation of g-cost and h-cost. Then, $C_{ini}$ is stored in openSet. In every iteration, the configuration in openSet with the lowest f-cost will be assigned as current. The neighbours of current would be found from matrix C by using the GET_NEIGHBOURS function. For each neighbour among current's neighbours, if the neighbour is not in the closeSet but in the openSet, then the function will update the cost information with the lower g-cost and assign current as the neighbour's new parent. However, if the neighbour is not in the openSet, its g-cost, h-cost, and f-cost would be calculated and stored into openSet. Typically, the improved A* search algorithm keeps iterating until current reaches $C_{tar}$. It can take a long time for the algorithm to figure out a single path, not to mention numerous paths in the case of modular home applications. Also, the newly generated path will contain many transit spots, which will reduce the moving efficiency of the robot arm due to the deceleration and re-acceleration of each joint. Therefore, a new terminated mechanism is added to the algorithm to reduce both the calculating time and the transit spots. Whenever a new current is assigned, the function will check if the h-cost of current is less than the penalty P. This ensures that no collision happens when the robot arm moves from current to the target configuration. Then, the loop will be terminated, and the path will be extended from current to $C_{tar}$.

---

ALGORITHM 1
GET_NEIGHBOURS (C, X, $c_{ini}$, $c_{tar}$)

Output:
Neighbours: a list of neighbour configurations of X
1:  $N_j$ ← get the number of columns in C
2:  Index ← get the index of X in C
3:  if Index.i == 1 do
4:      neighbours.add ($C_{ini}$)
5:      for i from Index.i to Index.i + 1 do
6:          for j from 1 to $N_j$ do
7:              neighbours.add (C[i][j])
8:          end for
9:      end for
10: else if Index.i == $N_j$ do
11:     neighbours.add ($C_{tar}$)
12:     for i from Index.i − 1 to Index.i do
13:         for j from 1 to $N_j$ do
14:             neighbours.add (C[i] [j])
15:         end for
16:     end for
17: else
18:     for i from Index.i − 1 to Index.i + 1 do
19:         for j from 1 to $N_j$ do
20:             neighbours. add (C[i] [j])
21:         end for
22      end for
23: end if
24: neighbours.remove (X)
25: return neighbours

---

ALGORITHM 2
GET_COST ($C_{start}$, $C_{end}$, P)

Output:
Cost: the travelling cost (time) for the robot to move from $C_{start}$ to $C_{end}$
1:  Cost ← get the PTP travelling time of the robot arm from $C_{start}$ to $C_{end}$
2:  if 3LOD_COLLISION_CHECK ( ) do
3:      Cost ← Cost + P
4:  end if
5:  return Cost

---

ALGORITHM 3
GET_PATH (X, $C_{ini}$)

Output:
Path: a list storing every configuration on the new collision-free path
1:  Path.add(X)
2:  temp ← X.parent
3:  while temp ! = $C_{ini}$ do
4:      Path.add (temp)
5:      temp ← temp.parent
6:  end while
7:  Path.add ($C_{ini}$)
8:  return Path

---

ALGORITHM 4
PATH_SEARCHING ($c_{ini}$, $c_{tar}$, C)

Input:
P: the cost penalty when collision happens
Output:
The new collision-free path from $c_{ini}$ to $c_{tar}$
1:  $C_{ini}$.gcost ← 0
2:  $C_{ini}$.hcost ← GET_COST ($C_{ini}$, $C_{tar}$)
3:  $C_{ini}$.fcost ← $C_{ini}$.gcost + $C_{ini}$.hcost
4:  openSet.add ($C_{ini}$)

-continued

ALGORITHM 4
PATH_SEARCHING ($c_{ini}$, $c_{tar}$, C)

```
5:   while openSet is not empty do
6:       current ← the configuration having lowest f-cost in openSet
7:       if current == C_tar do
8:           return GET_PATH (current, C_ini)
9:           break
10:      end if
11:      if current.hcost < P do
12:          C_tar.parent ← current
13:          return GET_PATH (C_tar, C_ini)
14:          break
15:      end if
16:      neighbours ← GET_NEIGHBOURS (C, current, c_ini, C_tar)
17:      foreach neighbour in neighbours do
18:          neighbour.parent ← current
19:          if neighbour is not in closeSet do
20:   neighbour.gcost ← current.gcost + GET_COST (current, neighbour)
21:          neighbour.hcost ← GET_COST ( neighbour, c_tar )
22:          neighbour.fcost ← neighbour.gcost + neighbour.hcost
23:          if neighbour is in openSet do
24:              n ← get element in the openSet which is the same with
                 neighbour
25:              if neighbour.fcost < n.fcost do
26:                  replace n with neighbour
27:              end if
28:          else
29:              openSet.add (neighbour)
30:          end if
31:      end if
32:      end foreach
33:      closeSet.add(current)
34:      openSet.remove(current)
35:  end while
```

The platform 130, preferably a commercial robotic simulator, is used to implement the developed path-finding method. The platform 130 is a robotic simulator that provides a virtual environment for planning, simulating, and controlling the robotic system with built-in FK and IK (inverse kinematic) solvers for industrial robot arms made by the most well-known manufacturers over the world. The simulator also allows the user to import 3D models from BIM software, such as Autodesk Revit, and automatically generate robot trajectories based on the 3D design. The following subsections will describe the digital virtual model setup in the platform 130, the configuration sampling with the gripped object, and the path searching with the improved A* search algorithm.

Figure 7:
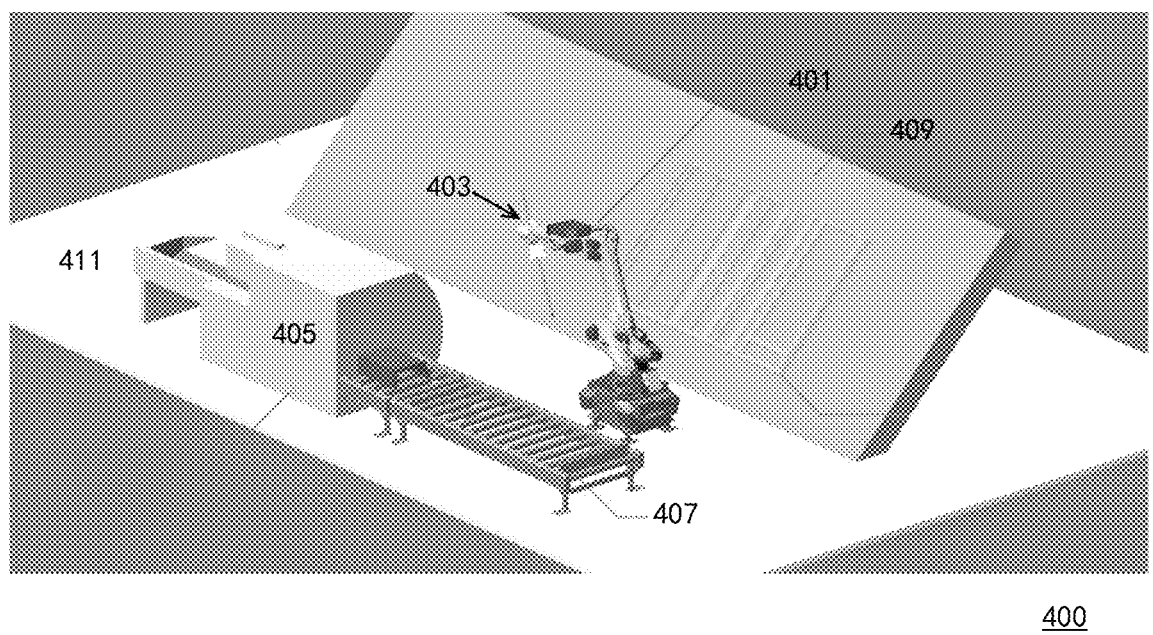
FIG. 7 is a schematic diagram perspective view illustrating a digital virtual model for modelling a robotic wall panel assembly line created in the virtual working environment on the platform in accordance with the present invention.
Figure 8A:
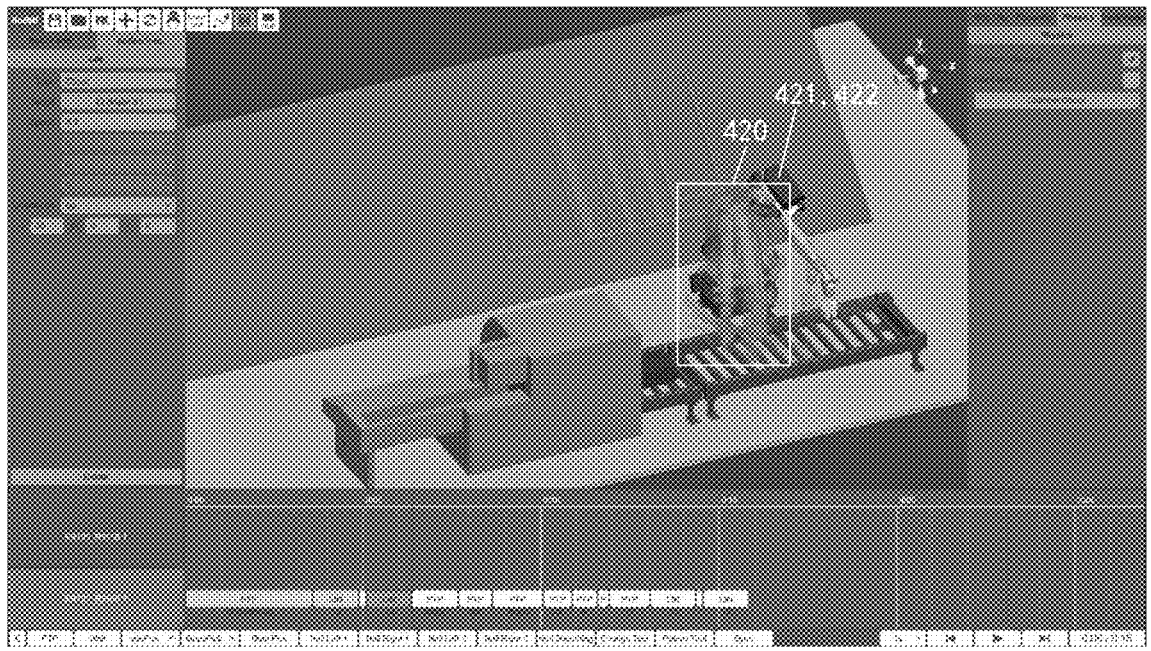
FIG. 8(a) to FIG. 8(d) are schematic diagrams illustrating a first embodiment demonstrating a randomly sampling example in order to find out a collision-free path for the virtual robot and the end effector to move to assembly a wooden wall panel in a robotic wall panel assembly line in the virtual working environment on the platform in accordance with the present invention.
Figure 8B:
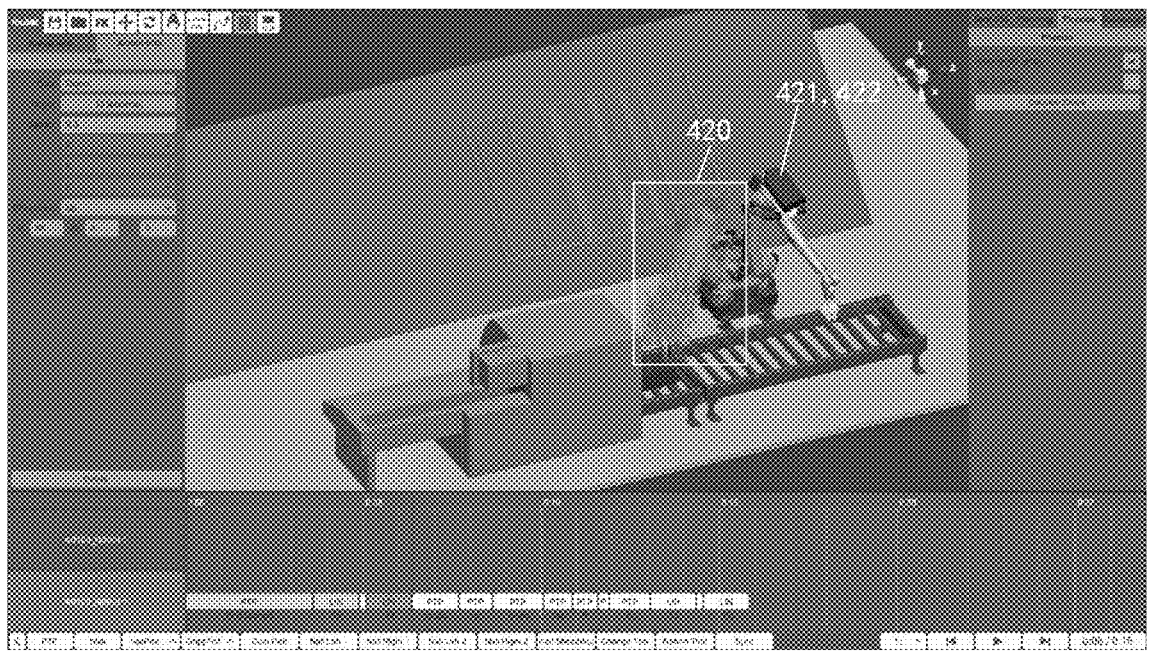
Figure 8C:
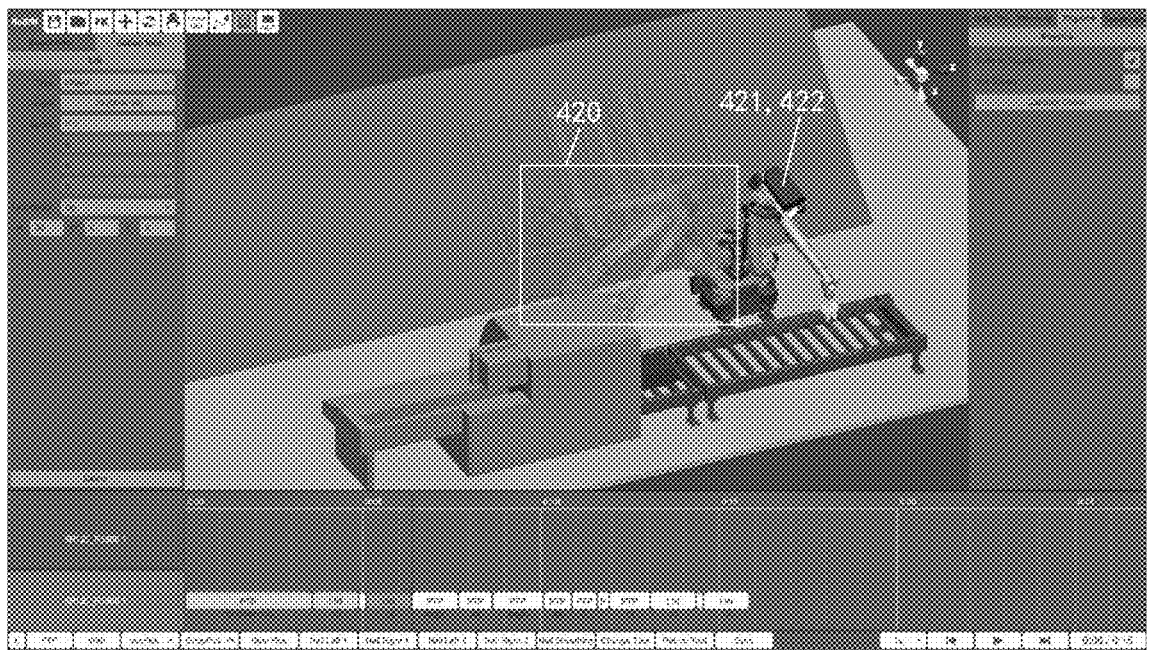
Figure 8D:
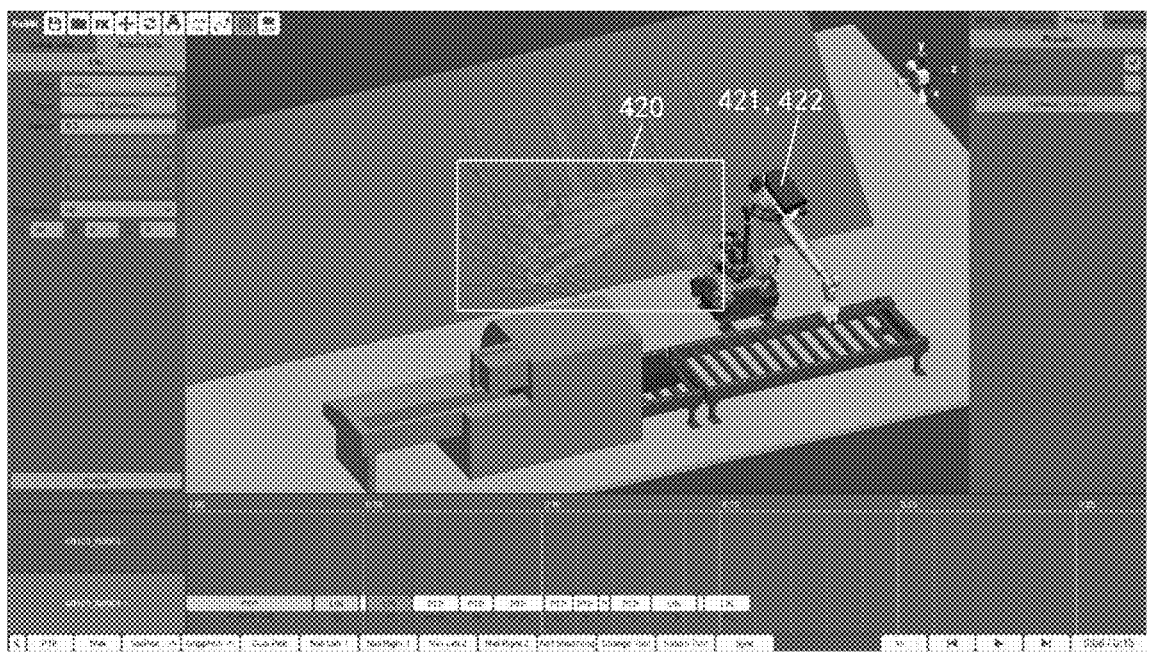
Figure 9A:
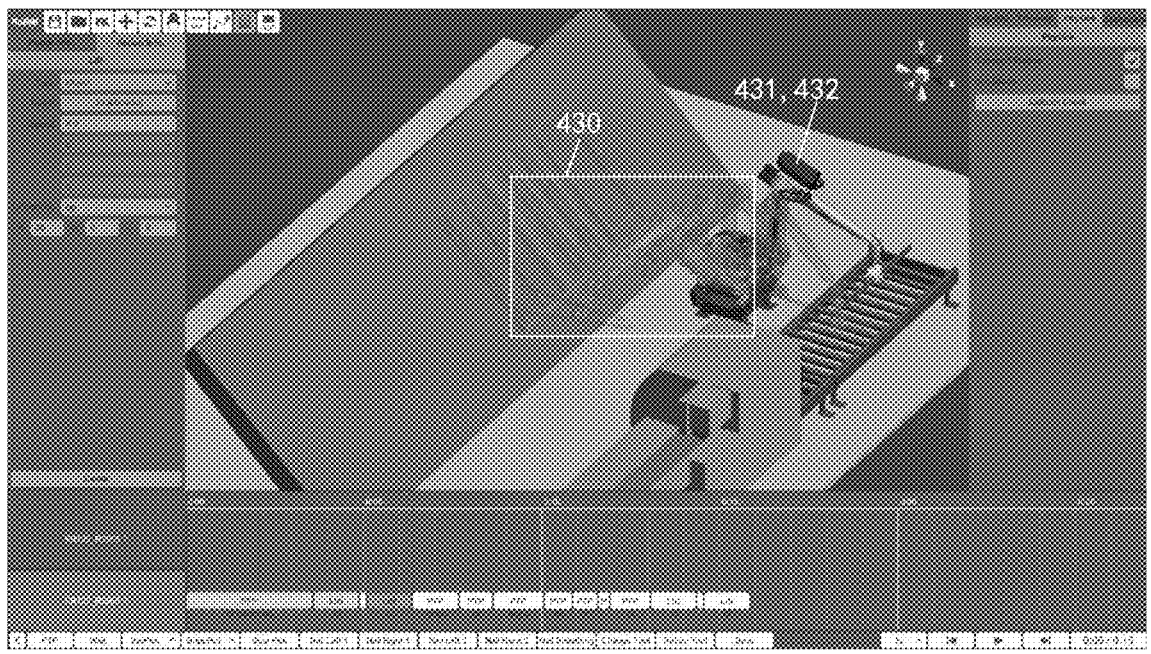
FIG. 9(a) to FIG. 9(h) are schematic diagrams illustrating a second embodiment demonstrating a randomly sampling example in order to find out a collision-free path for the virtual robot and the end effector to move to assembly a wooden wall panel in a robotic wall panel assembly line in the virtual working environment on the platform in accordance with the present invention.
Figure 9B:
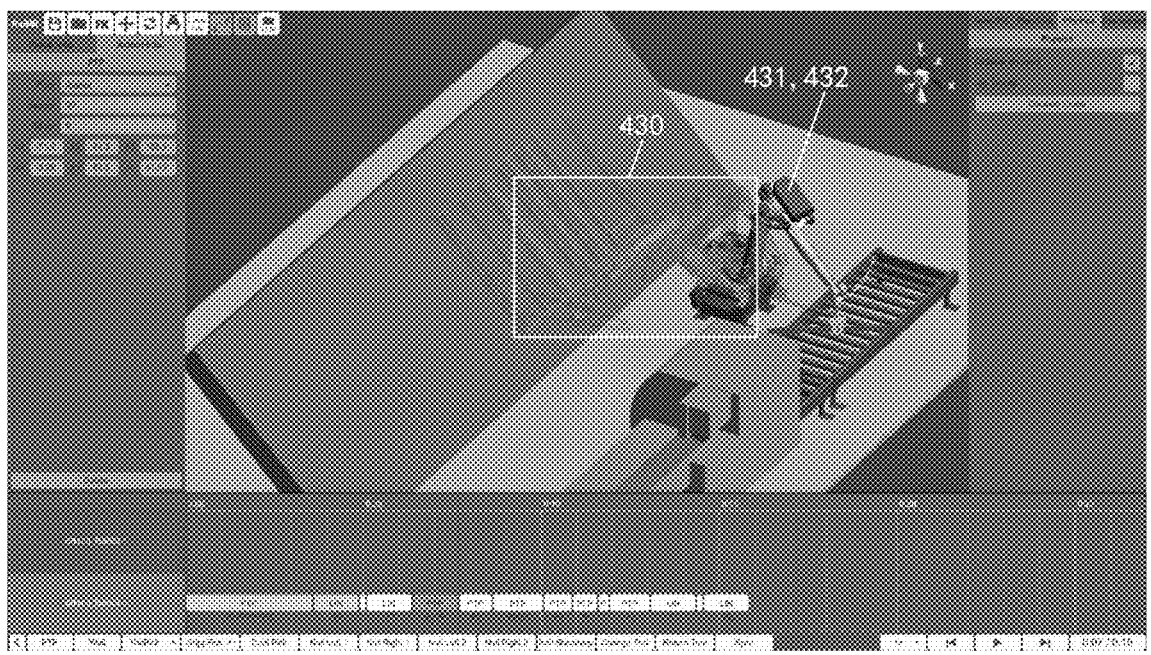
Figure 9C:
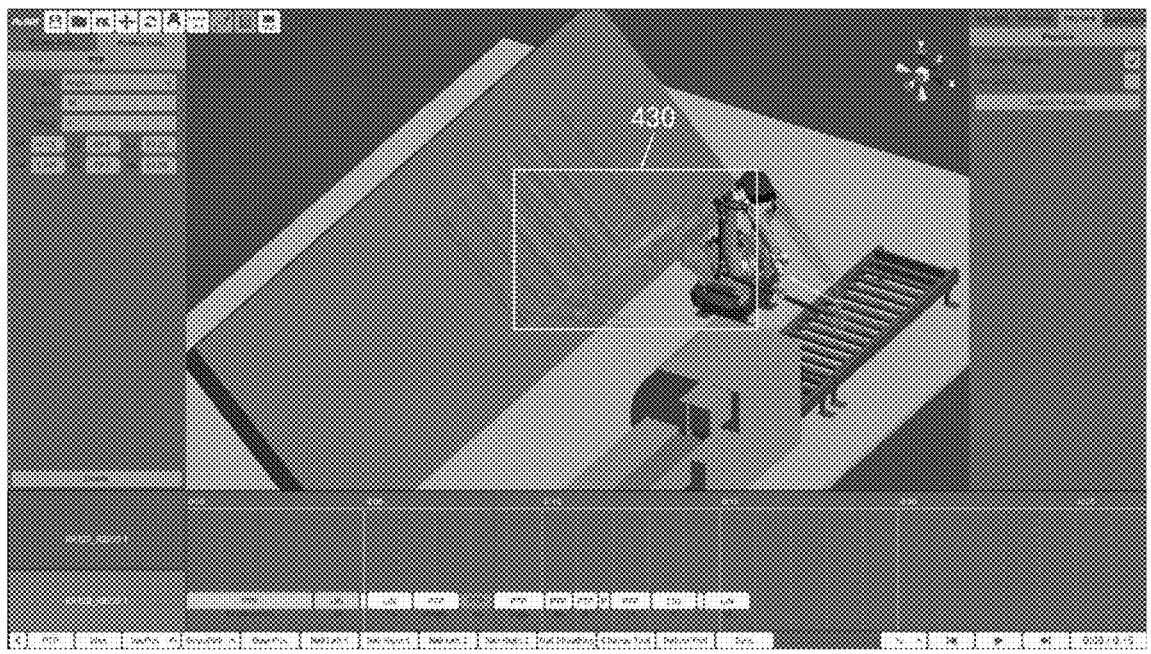
Figure 9D:
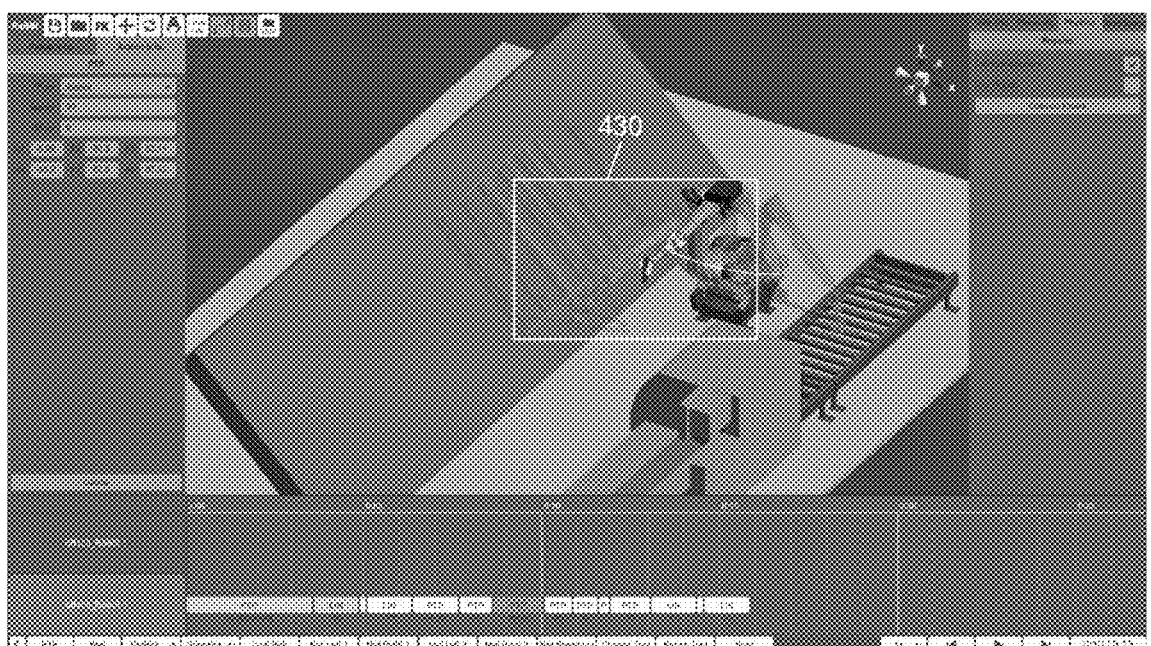
Figure 9E:
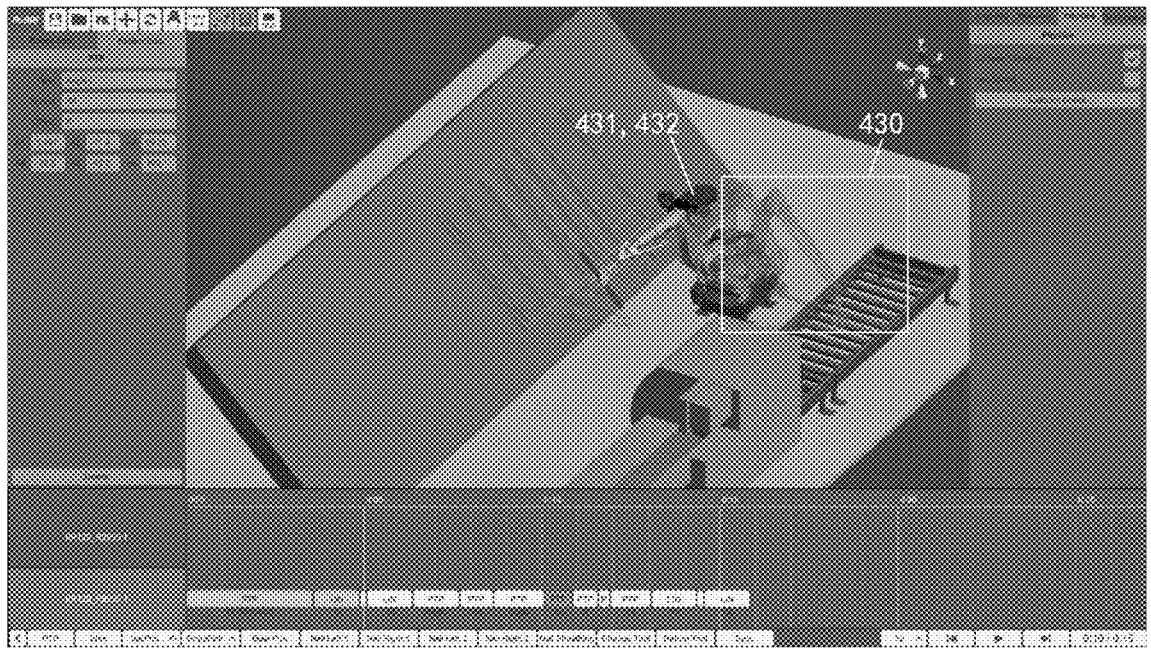
Figure 9F:
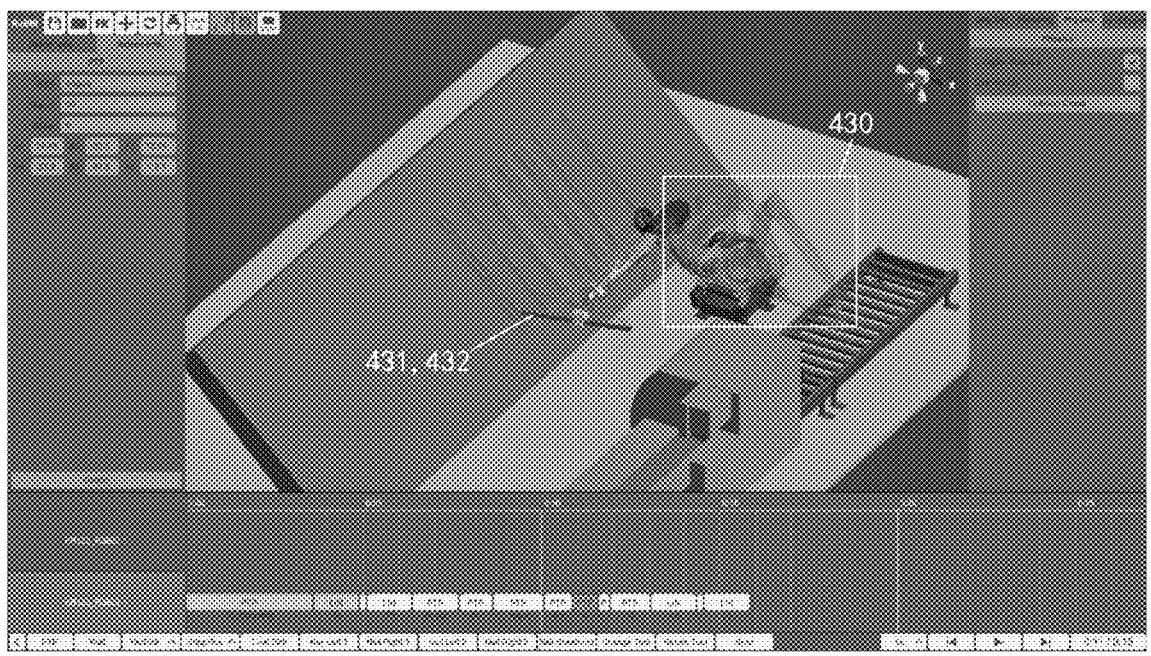
Figure 9G:
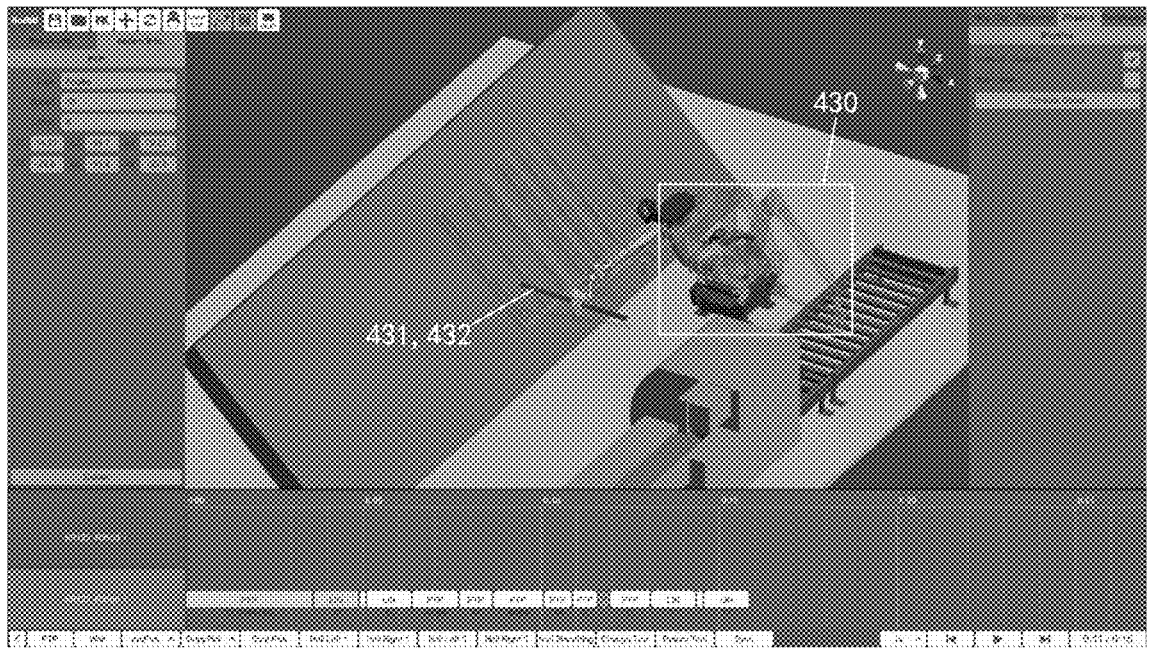
Figure 9H:
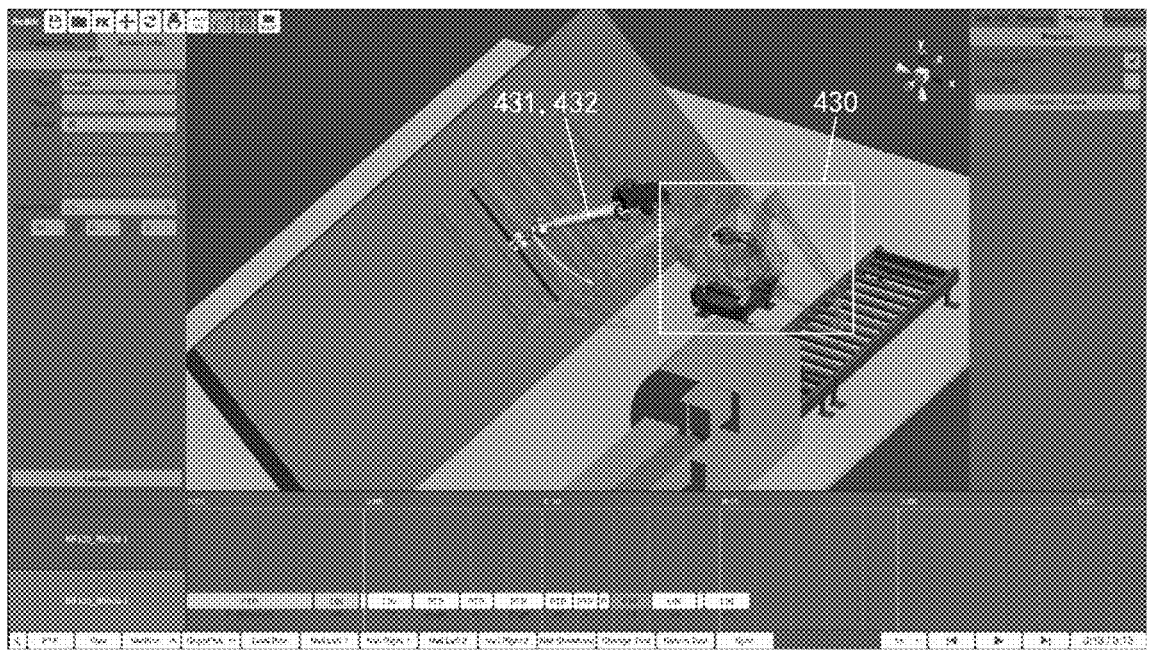

FIG. 7 is a schematic diagram perspective view illustrating a digital virtual model for modelling a robotic wall panel assembly line created in the virtual working environment on the platform in accordance with the present invention. As shown in FIG. 7, a digital virtual model for modelling a robotic wall panel assembly line is first created in the virtual working environment in the platform 130, to test the developed collision-free path-finding method.

In this embodiment, the virtual production line 400 is preferably a virtual robotic wall panel assembly line including an industrial robot arm 401 equipped with a gripper 403, a CNC machine 405 for material cutting, a conveyor 407 for transporting the cut material, a workstation 409 for panel assembly tasks, and the ground surface 411 of the plant. The industrial robot arm 401 is preferably but not limited to the KUKA KR120 R3900 with a reach of 3.9 meters. A panel assembly table, a material feeding conveyor, a CNC cutting machine, and the ground surface are also built in the virtual environment. The platform 130 has a built-in FK/IK solver which is used for generating the robotic trajectories.

TABLE 2 shows the hierarchical 3-LOD collider setting structure of the virtual assembly line. Four low level box colliders are used for covering the material feeding conveyor, the CNC cutting machine, the panel assembly table, and the ground surface. The feeding conveyor includes four medium level box colliders, including the stopping block, rollers, front-side, and back-side components of the conveyor. The cutting machine contains six medium level colliders, including the CNC machine, the material feeding table, the control box, the exit box, the computer, and the exit conveyor of the cutting machine. It also contains 12 high level colliders, including mesh collider of the CNC machine; table and control buttons of the material feeding table; monitor and control buttons of the computer; and stopping block, rollers, front-side and back-side components for the exit conveyor.

TABLE 2

| Low LOD | Medium LOD | High LOD |
|---|---|---|
| Feeding conveyor (Box-collider) | Stopping block (Box-collider) Rollers (Box-collider) Front-side component (Box-collider) Back-side component (Box-collider) | |
| Cutting machine (Box-collider) | CNC machine (Box-collider) Material feeding table (Box-collider) | CNC machine (Mesh-collider) Table (Box-collider) Control button 1 (Box-collider) Control button 2 (Box-collider) |
| | Control box (Box-collider) Exit box (Box-collider) Computer (Box-collider) | Monitor (Box-collider) Control button 1 (Mesh-collider) Control button 2 (Mesh-collider) Control button 3 (Mesh-collider) |
| | Exit conveyor (Box-colhder) | Stopping block (Box-collider) Rollers (Box-collides) Front-side component (Box-collider) Back-side component (Box-collider) |
| Assembly table (Box-collider) | | |
| Ground surface (Box-collider) | | |

In the sampling phase, the manual inputs consist of the following three parameters: the number of discrete pieces, the number of nodes for each piece, and the maximum configuration distance. The number of discrete pieces and the number of nodes must be carefully chosen as sampling too many configurations may lead to a lengthy computational calculation in the path searching phase. Also, the more complex the environment is, the more discrete pieces should be chosen so that the robot arm can have more possibilities to find the collision-free solution.

FIG. 8(*a*) to FIG. 8(*d*) are schematic diagrams illustrating a first embodiment demonstrating a randomly sampling example in order to find out a collision-free path for the virtual robot and the end effector to move to assembly a wooden wall panel in a robotic wall panel assembly line in the virtual working environment on the platform in accordance with the present invention. The example shows the sampling results with five discrete pieces, ten nodes for each piece and 440.9 degrees (180 degrees for each joint) for the maximum configuration distance. With these inputs, a four by eleven matrix was generated. The green robot arms with gripped objects in the four images shown in FIG. 8(a) to FIG. 8(d) illustrate the generated configurations for each piece. The 44 configurations would be used for the path searching in the next phase. It is shown in FIG. 8(a) through 8(d), the collision-free path 420 for the animated robot arm 421 and the end effector 422 equipped thereon to follow is computed and determined prior to the commencement of the assembly operation.

The improved A* search algorithm is preferably employed in this embodiment to find out a collision-free path among the generated configurations in the sampling phase. In this phase, the cost penalty for calculating the travelling cost of each configuration should be set manually. The penalty should be set as a sufficiently large number to be able to distinguish whether there is a collision between each configuration or not. The result will be stored as a list of configurations. The platform 130 has the FK/IK solver which is then used to create the PTP motions between each configuration.

FIG. 9(a) to FIG. 9(h) are schematic diagrams illustrating a second embodiment demonstrating a randomly sampling example in order to find out a collision-free path for the virtual robot and the end effector to move to assembly a wooden wall panel in a robotic wall panel assembly line in the virtual working environment on the platform in accordance with the present invention. By using the same example described in FIG. 8(a) to FIG. 8(d), it shows the collision-free pathfinding searching results on the platform 130. The penalty for collisions was set as 10,000 seconds. Six new configurations between the initial and target configurations are selected as the transit spots to avoid collisions. The FK/IK solver in the platform 130 was then used to link these configurations with seven new PTP motions. It is shown in FIG. 9(a) through 9(h), the animated robot arm 431 and the end effector 432 equipped thereon follow the computed collision-free path 430 to move well.

In conclusion, the present invention provides a pathfinding method for using an industrial robot arm in off-site robotic prefabrication, for example, a modular home prefabrication. The proposed method has advantages to the knowledge in the art field as follows:

(1) The collision-free path generation in consideration of the size of the building components: The path-finding method proposed in the present study can solve collision problems by sampling configurations of the robot arm and taking into account the size of the building component. Without considering the size of the target object, the broad searching area might cause an unnecessary increase in calculation time, and the newly generated path might cause the robot arm to move a large object to an unpredictable position, which is an unacceptable outcome. By constraining the searching area according to the size of the component, the proposed method can find a new path within a limited searching area more efficiently.

(2) Visible path-finding process: The proposed method uses a virtual robot arm to navigate in a simulated environment instead of using the concept of C-space. Conventionally, the motion planning method is deployed in C-space. However, constructing C-space is computationally expensive, especially when the environment and the gripped object keep changes during the assembly process. Also, finding a new path in the high dimensional space is hard for engineers to imagine or visualize. The path searching process and the new collision-free path can be revealed in the virtual environment using a game engine-based environment. The engineer can observe results and conduct the human-robot interaction plan before moving to the real robotic production line.

(3) A universal pathfinder: The present invention provides a universal pathfinder for the application of modular home prefabrication. The path generator can be utilized on every commercial robot arm by providing the 3D model and FK/IK solver of the robot arm.

Figure 10:
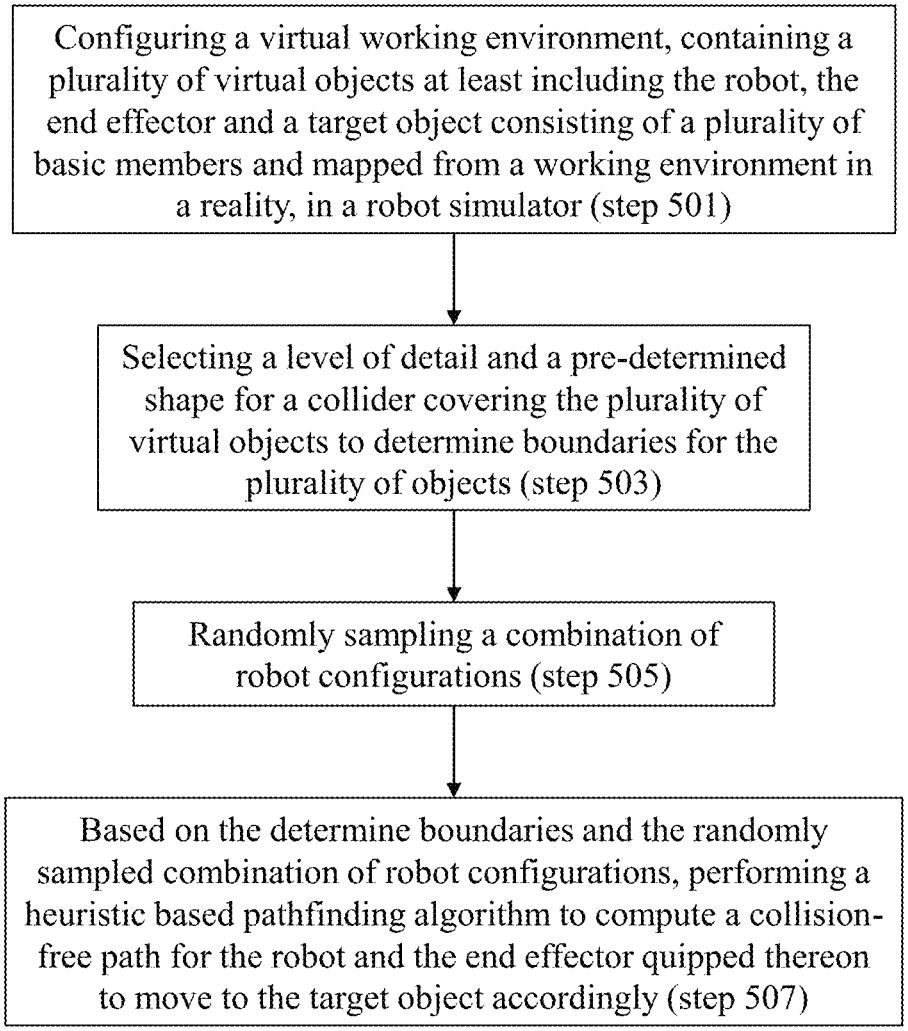
FIG. 10 is a flow chart illustrating the cloud based collision-free path generating method for a robot and an end effector quipped thereon to move in accordance with the present invention.

FIG. 10 is a flow chart illustrating the cloud based collision-free path generating method for a robot and an end effector quipped thereon to move in accordance with the present invention. To sum up, the cloud based collision-free path generating method 500 for a robot and an end effector quipped thereon to move in accordance with the present invention preferably includes the steps as follows: configuring a virtual working environment, containing a plurality of virtual objects at least including the robot, the end effector and a target object consisting of a plurality of basic members and mapped from a working environment in a reality, in a robot simulator (step 501); selecting a level of detail and a pre-determined shape for a collider covering the plurality of virtual objects to determine boundaries for the plurality of objects (step 503); randomly sampling a combination of robot configurations (step 505); and based on the determine boundaries and the randomly sampled combination of robot configurations, performing a heuristic based pathfinding algorithm to compute a collision-free path for the robot and the end effector quipped thereon to move to the target object accordingly (step 507).

There are further embodiments provided as follows.

Embodiment 1: A collision-free path generating method, for a robot and an end effector quipped thereon to move, includes steps of: configuring a virtual working environment, containing a plurality of virtual objects at least including the robot, the end effector and a target object consisting of a plurality of basic members and mapped from a working environment in a reality, in a robot simulator; selecting a level of detail and a pre-determined shape for a collider covering the plurality of virtual objects to determine boundaries for the plurality of objects; randomly sampling a combination of robot configurations; and based on the determine boundaries and the randomly sampled combination of robot configurations, performing a heuristic based pathfinding algorithm to compute a collision-free path for the robot and the end effector quipped thereon to move to the target object accordingly.

Embodiment 2: The collision-free path generating method as described in Embodiment 1, the level of detail at least includes a high level-of-detail, a medium level-of-detail, and a low level-of-detail.

Embodiment 3: The collision-free path generating method as described in claim 1, the pre-determined shape is selected from a rectangular shape, a box shape, a round shape, a triangular shape, a cone shape, and a combination thereof.

Embodiment 4: The collision-free path generating method as described in Embodiment 1, the heuristic based pathfinding algorithm is selected from one of an improved A star search algorithm, an A star search algorithm, a metaheuristic search algorithm, an inference engine algorithm, a binary search algorithm, a hill climbing algorithm, a simulated annealing algorithm, a genetic algorithm, a tabu search algorithm, a heuristic based shortest path faster algorithm, and a combination thereof.

Embodiment 5: The collision-free path generating method as described in Embodiment 1, the virtual working environment further includes a material cutting machine, a material transportation machine, and a robot workstation Embodiment 6: The collision-free path generating method as described in Embodiment 1, the plurality of basic members is the essential element used to build up a building that is constructed by implementing civil engineering based construction works and selected from one of a stud, a frame, a sheathing board, a wall panel, a floor panel, and a combination thereof.

Embodiment 7: The collision-free path generating method as described in Embodiment 6, the building is selected from one of a house, a wooden house, a reinforced concrete building, a steel building, a steel-reinforced concrete building, a residential complex, an apartment complex, a condominium, a dwelling unit, a skyscraper, and a combination thereof.

Embodiment 8: A computer-implemented system includes: a user equipment installed with a web browser to enable web browsing to access an internet for a user to operate; and a cloud computing server system available on the internet providing for the user to operate via the web browser on the user equipment and configured to: configure a virtual working environment, containing a plurality of virtual objects at least including the robot, the end effector and a target object consisting of a plurality of basic members and mapped from a working environment in a reality, in a robot simulator; select a level of detail and a pre-determined shape for a collider covering the plurality of virtual objects to determine boundaries for the plurality of objects; randomly sample a combination of robot configurations; and based on the determine boundaries and the randomly sampled combination of robot configurations, perform a heuristic based pathfinding algorithm to compute a collision-free path for the robot and the end effector quipped thereon to move to the target object accordingly.

Embodiment 9: The computer-implemented system as described in Embodiment 8, further includes one of following elements: a computer-assisted cloud based robotic construction platform installed on the cloud computing server system and configured to provide the visualization interface for a user to operate through the web browser, wherein the computer-assisted cloud based robotic construction platform is established based on the software as a service (SAAS) technology and the platform as a service (PAAS) technology; and the user equipment providing and running the web browser for the user to operate to access the computer-assisted cloud based robotic construction platform on the cloud computing server system remotely through the visualization interface to create the action collection.

Embodiment 10: The computer-implemented system as described in Embodiment 8, the user equipment is selected from one of a personal computer, a notebook computer, a tablet device, a mobile device, and a smart phone.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A collision-free path generating method, for a robot and an end effector equipped thereon to move, comprising:
    configuring a virtual working environment, containing a plurality of virtual objects at least including the robot, the end effector and a target object consisting of a plurality of basic members and mapped from a working environment in a reality, in a robot simulator;
    implementing a three level of detail based three-step collision check scheme that includes three collision check steps as follows to determine boundaries for the plurality of virtual objects:
        randomly sampling a combination of first robot configurations;
        performing a first step based on a first level-of-detail to cover each of the plurality of virtual objects with a first collider having a pre-determined first shape and check whether a first collision is detected between a plurality of first boundaries of a plurality of the first colliders;
        performing a second step based on a second level-of-detail to cover each of a plurality of components included in the each of the plurality of virtual objects with a second collider having a pre-determined second shape and check whether a second collision is detected between a plurality of second boundaries of the plurality of second colliders, if a first collision is detected during the performance of the first step;
        performing a third step based on a third level-of-detail to use a plurality of mesh colliders to cover the each of the plurality of components and check whether a third collision is detected between a plurality of third boundaries of the plurality of mesh colliders, if a second collision is detected during the performance of the second step;
        randomly resampling the combination of robot configurations, if a third collision is detected during the performance of the third step; and
        repeatedly implementing the three level of detail based three-step collision check scheme until none of the first collision, the second collision, or the third collision is detected; and
    based on the determined boundaries and the randomly resampled combination of robot configurations, performing a heuristic based pathfinding algorithm to compute a collision-free path for the robot and the end effector equipped thereon to move to the target object accordingly.

2. The collision-free path generating method as claimed in claim 1, wherein the three level of detail based three-step collision check scheme at least includes three level-of-detail containing the first level-of-detail, the second level-of-detail, and the third level-of-detail.

3. The collision-free path generating method as claimed in claim 1, wherein the pre-determined first shape and the pre-determined second shape is selected from a rectangular shape, a box shape, a round shape, a triangular shape, a cone shape, or a combination thereof.

4. The collision-free path generating method as claimed in claim 1, wherein the heuristic based pathfinding algorithm is selected from one of an improved A star search algorithm, an A star search algorithm, a metaheuristic search algorithm, an inference engine algorithm, a binary search algorithm, a hill climbing algorithm, a simulated annealing algorithm, a genetic algorithm, a tabu search algorithm, a heuristic based shortest path faster algorithm, and a combination thereof.

5. The collision-free path generating method as claimed in claim 1, wherein the virtual working environment further includes a material cutting machine, a material transportation machine, and a robot workstation.

6. The collision-free path generating method as claimed in claim 1, wherein the plurality of basic members is the essential element used to build up a building that is constructed by implementing civil engineering based construction works and selected from one of a stud, a frame, a sheathing board, a wall panel, a floor panel, and a combination thereof.

7. The collision-free path generating method as claimed in claim 6, wherein the building is selected from one of a house, a wooden house, a reinforced concrete building, a steel building, a steel-reinforced concrete building, a residential complex, an apartment complex, a condominium, a dwelling unit, a skyscraper, and a combination thereof.

8. A computer-implemented system, comprising:
   a user equipment installed with a web browser to enable web browsing to access an internet for a user to operate; and
   a cloud computing server system available on the internet providing for the user to operate via the web browser on the user equipment and configured to:
      configure a virtual working environment, containing a plurality of virtual objects at least including the robot, the end effector and a target object consisting of a plurality of basic members and mapped from a working environment in a reality, in a robot simulator;
      implement a three level of detail based three-step collision check scheme that includes three collision check steps as follows to determine boundaries for the plurality of virtual objects:
         randomly sampling a combination of first robot configurations;
         performing a first step based on a first level-of-detail to cover each of the plurality of virtual objects with a first collider having a pre-determined first shape and check whether a first collision is detected between a plurality of first boundaries of a plurality of the first colliders;
         performing a second step based on a second level-of-detail to cover each of a plurality of components include in the each of the plurality of virtual objects with a second collider having a pre-determined second shape and check whether a second collision is detected between a plurality of second boundaries of the plurality of second colliders, if a first collision is detected during the performance of the first step;
         performing a third step based on a third level-of-detail to use a plurality of mesh colliders to cover the each of the plurality of components and check whether a third collision is detected between a plurality of third boundaries of the plurality of mesh colliders, if a second collision is detected during the performance of the second step;
         randomly resampling the combination of robot configurations, if a third collision is detected during the performance of the third step; and
         repeatedly implementing the three level of detail based three-step collision check scheme until none of the first collision, the second collision, or the third collision is detected; and
      based on the determined boundaries and the randomly resampled combination of robot configurations, perform a heuristic based pathfinding algorithm to compute a collision-free path for the robot and the end effector quipped thereon to move to the target object accordingly.

9. The computer-implemented system as claimed in claim 8, further comprising one of following elements:
   a computer-assisted cloud based robotic construction platform installed on the cloud computing server system and configured to provide the visualization interface for a user to operate through the web browser, wherein the computer-assisted cloud based robotic construction platform is established based on the software as a service (SAAS) technology and the platform as a service (PAAS) technology; and
   the user equipment providing and running the web browser for the user to operate to access the computer-assisted cloud based robotic construction platform on the cloud computing server system remotely through the visualization interface to create an action collection.

10. The computer-implemented system as claimed in claim 8, wherein the user equipment is selected from one of a personal computer, a notebook computer, a tablet device, a mobile device, and a smart phone.

\* \* \* \* \*